(12) United States Patent
Fujioka et al.

(10) Patent No.: US 8,318,124 B2
(45) Date of Patent: Nov. 27, 2012

(54) PRODUCING METHOD AND APPARATUS OF CARBON NANOFIBERS

(75) Inventors: Yuichi Fujioka, Nagasaki (JP); Toshihiko Setoguchi, Nagasaki (JP); Kazuya Suenaga, Nagasaki (JP); Susumu Miki, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 976 days.

(21) Appl. No.: 10/540,974

(22) PCT Filed: Nov. 27, 2003

(86) PCT No.: PCT/JP03/15172
§ 371 (c)(1),
(2), (4) Date: Jun. 27, 2005

(87) PCT Pub. No.: WO2004/070094
PCT Pub. Date: Aug. 19, 2004

(65) Prior Publication Data
US 2006/0104887 A1 May 18, 2006

(30) Foreign Application Priority Data
Feb. 6, 2003 (JP) .................. 2003-030096

(51) Int. Cl.
*D01F 9/127* (2006.01)
*D01F 9/12* (2006.01)
*D01F 9/133* (2006.01)

(52) U.S. Cl. .................. 423/447.3; 423/447.1; 977/843; 422/139; 422/209

(58) Field of Classification Search ............... 423/447.3, 423/447.1, 447.2, 445 B; 977/742–754, 977/842–848; 422/139, 209
See application file for complete search history.

(56) References Cited

U.S. PATENT DOCUMENTS
3,990,964 A * 11/1976 Gustafson ................. 208/216 R
(Continued)

FOREIGN PATENT DOCUMENTS
JP 03-174018 7/1991
(Continued)

OTHER PUBLICATIONS

Zhang, et al., Mesoporous Aluminosilicates with Ordered Hexagonal Structure, Strong Acidity, and Extraordinary Hydrothermal Stability at High Temperatures, J. Am. Chem. Soc. 2001; 123: 5014-5021.*

(Continued)

Primary Examiner — Daniel C. McCracken
(74) Attorney, Agent, or Firm — Wenderoth, Lind & Ponack, L.L.P.

(57) ABSTRACT

The present invention is provided with a reaction apparatus (12) that supplies carbon raw material (11) and fine particles (50) to cause carbon nanofibers to grow on surfaces of the fine particles (50), a heating apparatus (20) that heats the reaction apparatus 12, a recovery line (23) that recovers fine particles on which the carbon nanofibers have grown from the reaction apparatus, and a carbon nanofiber separating apparatus (24) that separates carbon nanofibers (52) from the recovered fine particles on which carbon nanofibers have been grown.

25 Claims, 41 Drawing Sheets

(a) CARRYING CATALYST ON CLOSELY PACKED FINE PARTICLES (b) GROWTH OF CARBON NANOFIBERS DUE TO CATALYST ACTION (c) SEPARATION OF CARBON NANOFIBERS FROM CLOSELY PACKED FINE PARTICLES DUE TO PHYSICAL OR CHEMICAL ACTION (d) DISSOLVING CATALYST DUE TO ACIDIC DISSOLUTION

U.S. PATENT DOCUMENTS

| | | | |
|---|---|---|---|
| 5,102,647 A * | 4/1992 | Yamada et al. | 423/447.3 |
| 5,618,875 A * | 4/1997 | Baker et al. | 524/495 |
| 6,413,487 B1 * | 7/2002 | Resasco et al. | 423/447.3 |
| 6,645,455 B2 * | 11/2003 | Margrave et al. | 423/447.1 |
| 6,761,870 B1 * | 7/2004 | Smalley et al. | 423/447.3 |

FOREIGN PATENT DOCUMENTS

| | | |
|---|---|---|
| JP | 06-280116 | 10/1994 |
| JP | 2001-019413 | 1/2001 |
| JP | 2001-139317 | 5/2001 |
| JP | 2001-520615 | 10/2001 |
| JP | 2003-238130 | 8/2003 |
| WO | 87/07559 A | 12/1987 |
| WO | 97/09272 | 3/1997 |
| WO | 01/94260 A1 | 12/2001 |
| WO | 01/94620 A | 12/2001 |

OTHER PUBLICATIONS

Ergun, et al., Fluid Flow through Randomly Packed Columns and Fluidized Beds, Ind. Eng. Chem. 1949; 41(6): 1179-1184.*

Kim, et al., Synthesis and Pore Size Control of Cubic Mesoporous Silica SBA-1, Chem. Mater. 1999; 11: 487-491.*

Cheng HM, et al: "Large-scale and low-cost synthesis of single walled carbon nanotubes by the catalytic pyrolysis of hydrocarbons" Applied Physics Letters, American Institute of Physics. Melville, NY. vol. 72, No. 25. Jun. 22, 1998. pp. 3282-3284.

Iijima, Sumio, "Helical microtubles of graphitic carbon" *Nature*, vol. 354, p. 56-58 (1991).

\* cited by examiner

FIG.1
(a) CARRYING CATALYST ON CLOSELY PACKED FINE PARTICLES
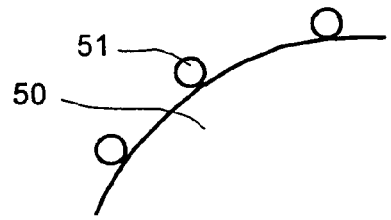
(b) GROWTH OF CARBON NANOFIBERS DUE TO CATALYST ACTION
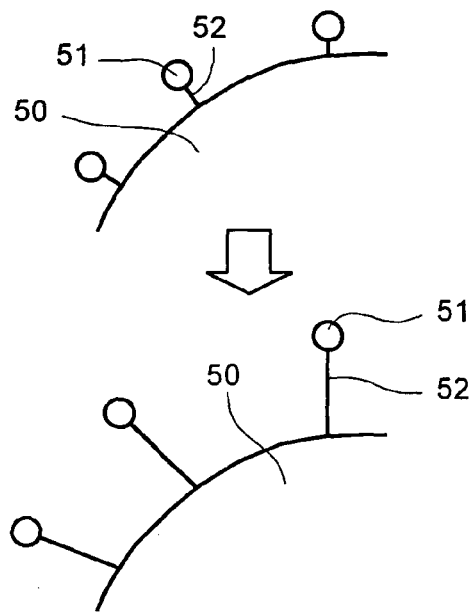
(c) SEPARATION OF CARBON NANOFIBERS FROM CLOSELY PACKED FINE PARTICLES DUE TO PHYSICAL OR CHEMICAL ACTION
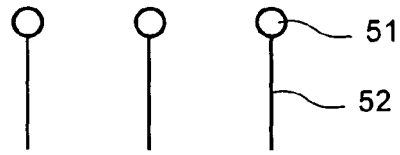
(d) DISSOLVING CATALYST DUE TO ACIDIC DISSOLUTION
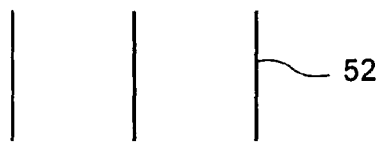

FIG.2
(a) CARRYING CATALYST ON CLOSELY PACKED FINE PARTICLES
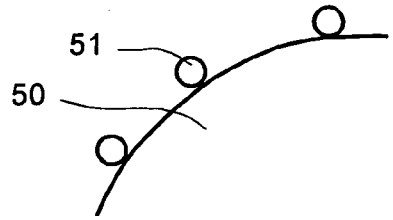
(b) GROWTH OF CARBON NANOFIBERS DUE TO CATALYST ACTION
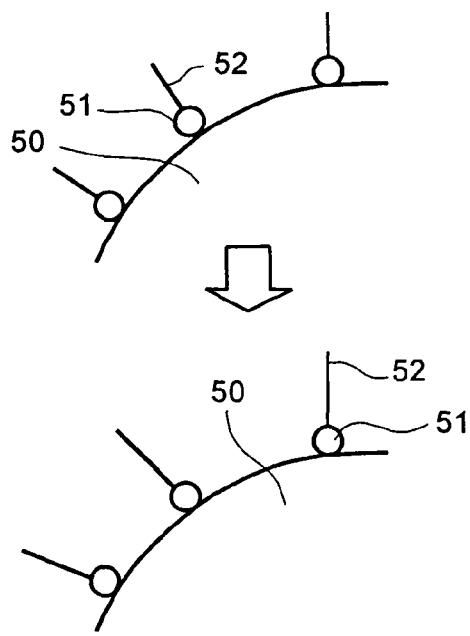
(c) SEPARATION OF CARBON NANOFIBERS FROM CLOSELY PACKED FINE PARTICLES DUE TO PHYSICAL OR CHEMICAL ACTION
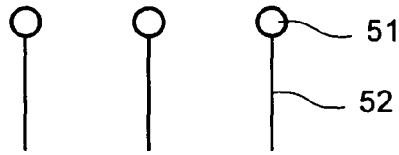
(d) DISSOLVING CATALYST DUE TO ACIDIC DISSOLUTION
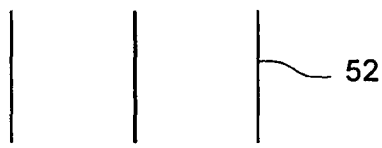

MECHANICAL SURFACE FRICTION
CONDUCTED BY BALL MILL OR THE LIKE

FIG.6
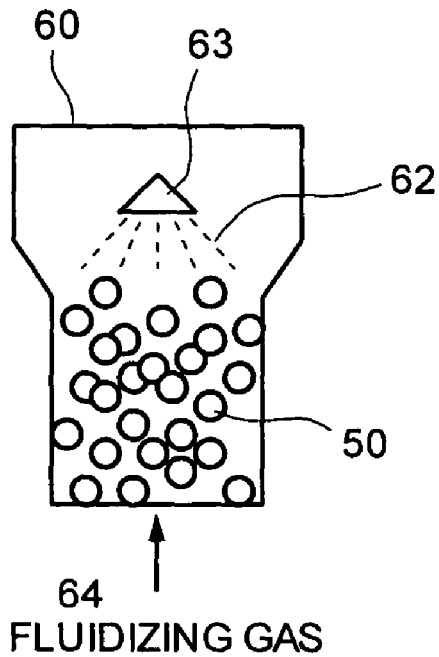
64 ↑
FLUIDIZING GAS
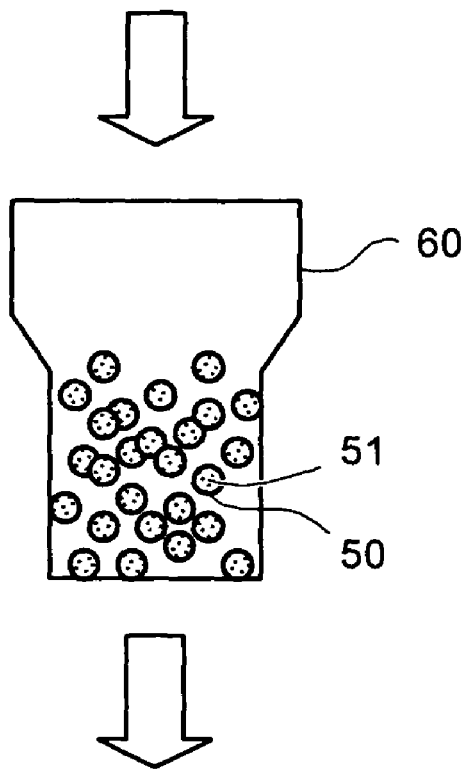
TO PRODUCING STEP FOR CARBON NANOFIBERS

TO PRODUCING STEP FOR
CARBON NANOFIBERS

FIG.22
(a)
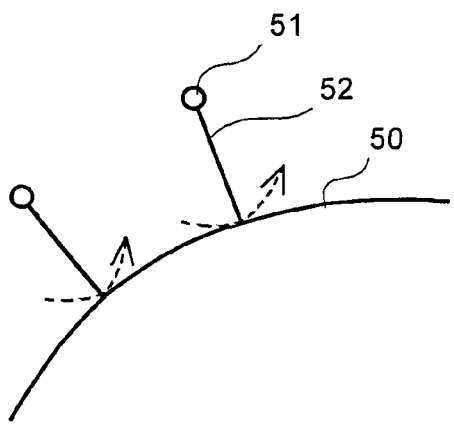
(b)
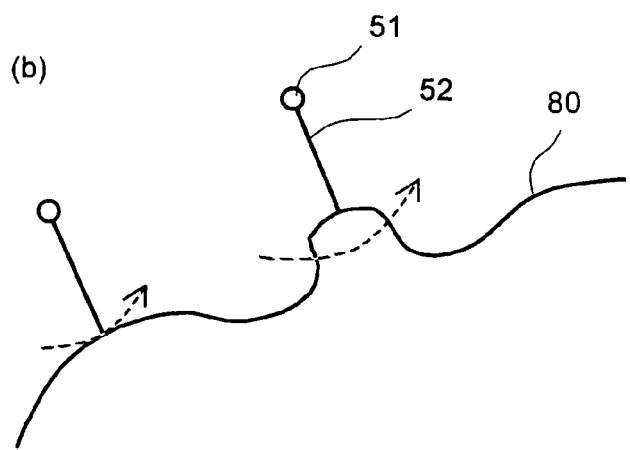
(c)
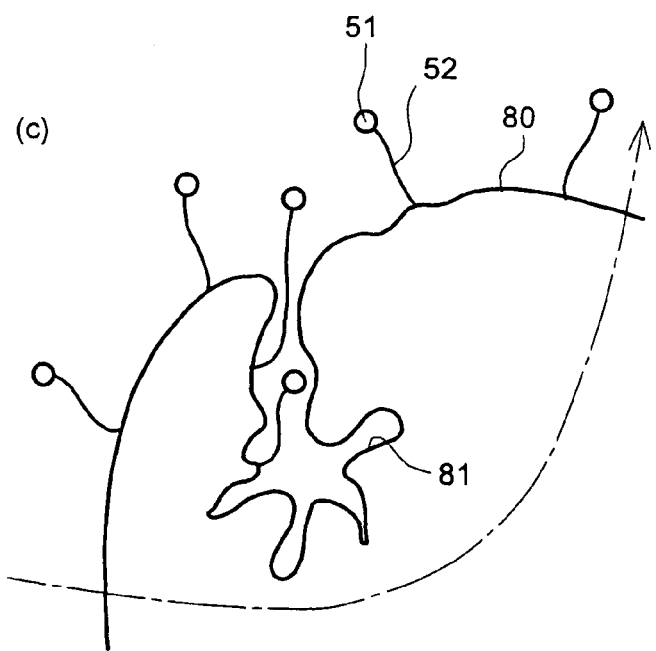

FIG.35
(a)
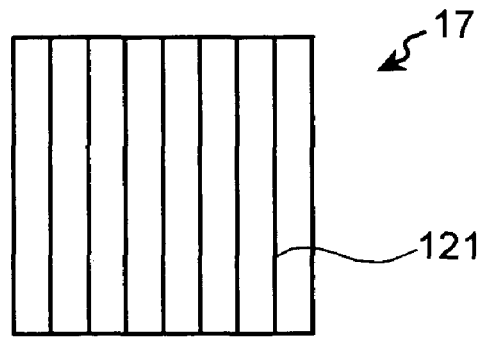
(b)
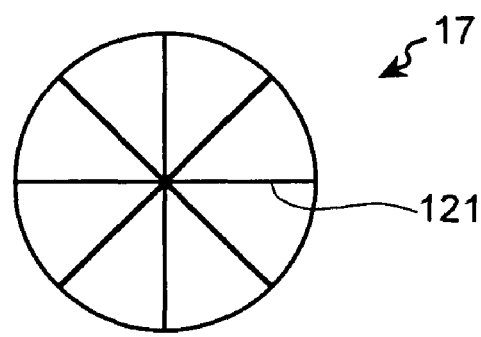
(c)
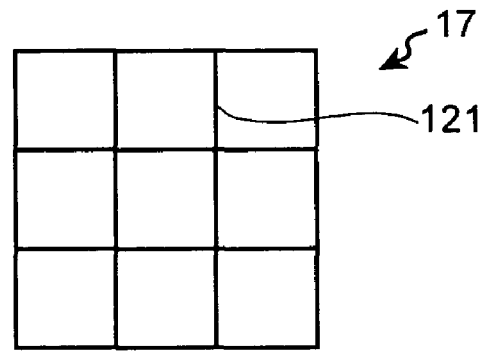

PRODUCING METHOD AND APPARATUS OF CARBON NANOFIBERS

TECHNICAL FIELD

The present invention relates to a producing method and apparatus of carbon nanofibers.

BACKGROUND ART

A carbon nanotube is a tubular carbon polyhedron having a structure where a graphite sheet forms a cylindrical shape. Among carbon nanotubes, there are multi-layer nanotubes having a multi-layer structure, where a graphite sheet forms a cylindrical shape, and single-layer nanotubes having a single layer structure where a graphite sheet forms a cylindrical shape.

The multi-layer nanotube was one of the nanotubes discovered by Iijima in 1991. Iijima discovered that multi-layer nanotubes were present in a carbon mass deposited on a cathode in an arc discharge process (S, Iijima, Nature, 354, 56 (1991)). Thereafter, research on multi-layer nanotubes was conducted. In recent years, the state of the art has reached such a level that multi-layer nanotubes can be synthesized in large quantity.

On the other hand, single-layer nanotubes have an inner diameter of about 0.4 to 100 nanometers (nm). Reports on the synthesis of single-layer nanotubes were simultaneously issued by Iijima and a group at IBM in 1993. The electronic state of a single-layer nanotube is predicted theoretically, and it is considered that the electronic physical properties vary from metallic to semiconductive depending on how the helix is wound. Accordingly, single-layer nanotubes are promising as a future electronic material.

As to other applications of single-layer nanotubes, nano-electronics material, a field electron emitting emitter, a high directionality radiation source, a soft X-ray source, one-dimensional conductive material, high heat conductive material, hydrogen occluding material, and the like, are considered. Further, it is thought that the application of single-layer nanotubes can be further expanded by including functional groups on the surface, metal coating thereof, and including foreign material.

Conventionally, single-layer nanotubes are produced by mixing metals such as iron, cobalt, nickel or lantanum into a carbon rod anode and performing arc discharge (Patent Literature 1).

In the production method using arc discharge, in addition to single-layer nanotubes, multi-layer nanotubes, graphite, and amorphous carbon are mixed in the final product, and the yield of the single layer nanotubes is not only low, but also fluctuation occurs in yarn diameter and yarn length. Therefore, it is difficult to produce single-layer nanotubes with relatively equal yarn diameters and yarn lengths.

Besides the arc discharge process, for the production of carbon nanotubes, a vapor phase cracking, a laser sublimation process, an electrolytic process of a condensed phase and the like have been proposed (see for example, JP-A-06-280116, Japanese Patent No. 3100962, JP-A-2001-520615, and JP-A-2001-139317).

However, the respective production methods disclosed in these publications are directed to methods performed in a laboratory or on a small-scale level, and they include the problem that the yield of carbon material is low.

Further, in the methods described above, it is difficult to implement a stable mass production such that production can not be performed continuously.

On the other hand, the recent availability of carbon material with nano-units (so-called carbon nanofiber) is expected, and it is desired that the carbon material can be mass-produced industrially.

In view of the problems of the prior art, the problem to be solved by the present invention is to provide a production method and apparatus for carbon nanofibers, which allows efficient production of carbon material with nano-units by a simple process.

DISCLOSURE OF THE INVENTION

An object of the present invention is to solve at least the above-described problems.

A production method of carbon nanofibers of the present invention, wherein carbon nanofibers are caused to grow on surfaces of fine particles, the fine particles and fine particles with grown carbon nanofibers are recovered, the carbon nanofibers are separated from the surfaces of fine particles by a physical process or a chemical process and the carbon nanofibers are recovered.

And a production apparatus of carbon nanofibers comprising:

a reaction apparatus that supplies carbon raw material and fine particles to cause carbon nanofibers to grow on surfaces of the fine particles;

a heating apparatus that heats the reaction apparatus;

a recovery line that recovers fine particles on which the carbon nanofibers have grown from the reaction apparatus; and a carbon nanofiber separating apparatus that separates carbon nanofibers from the recovered fine particles on which carbon nanofibers have been grown.

The above description, and other objects, features and advantages of the present invention will be made apparent from the following detailed description of the invention.

BRIEF DESCRIPTION OF THE DRAWINGS

FIG. 1 are illustrative diagrams of the growth of carbon nanofibers according to an embodiment of the present invention;

FIG. 2 are more illustrative diagrams of growth of the carbon nanofibers according to an embodiment of the present invention;

FIG. 6 is a schematic diagram of a production step of adhering fine catalyst to fine particles according to an embodiment of the present invention;

FIG. 22 are illustrative diagrams of peeling states of carbon nanofibers of the present invention;

FIG. 35 are schematic diagrams of partition members;

BEST MODE FOR CARRYING OUT THE INVENTION

Embodiments of the present invention will be explained in detail below. The present invention is not limited by these embodiments.

A production apparatus and a production method of carbon nanofibers of the present invention will be explained with the following embodiments shown together with attached drawings.

FIG. 1 are illustrative diagrams of states where carbon nanofibers grow on fine particles. FIG. 1($a$) is a status diagram where catalysts 51 are carried on surfaces of fine particles 50. FIG. 1($b$) is a status diagram where carbon nanofibers 52 grow due to catalyst action. FIG. 1($c$) is a status diagram where carbon nanofibers are separated from the fine particles 50 according to physical or chemical action. FIG. 1($d$) is a status diagram where the catalysts 51 are dissolved according to acid dissolution to obtain carbon nanofibers.

The production method of carbon nanofibers of the present invention causes carbon nanofibers 52 to grow on surfaces of fine particles 50, recovering the fine particles 50 and the fine particles 50 with growth carbon nanofibers 52, applying physical (or mechanical) separating process to them to separate the carbon nanofibers 52 from the surfaces of the fine particles 50, and recovering the carbon nanofibers 52.

Figure 3:
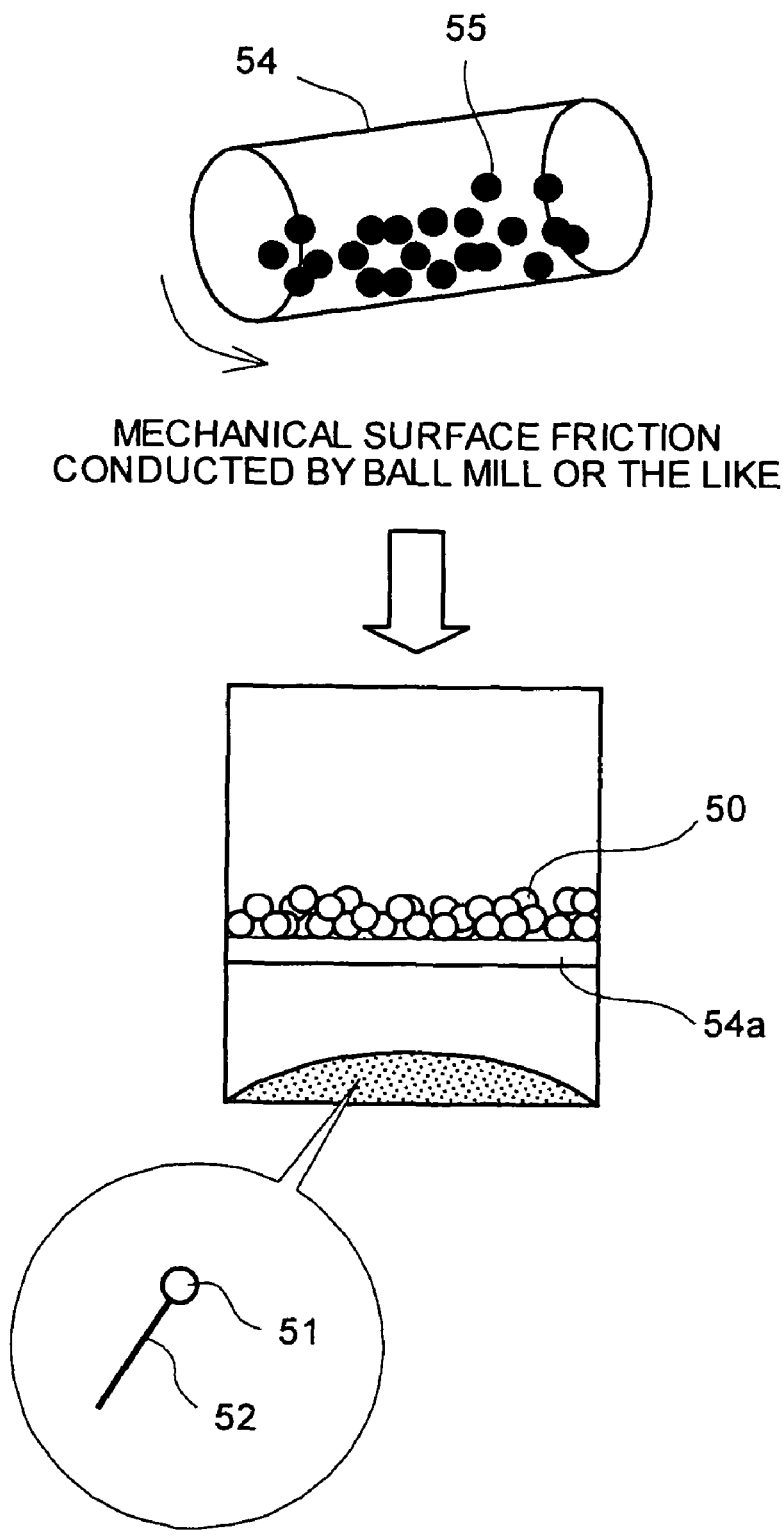
FIG. 3 is a schematic diagram of physically separating carbon nanofibers according to an embodiment of the present invention.

The physical separating process is a process that, for example, uses a ball mill 54 such as shown in FIG. 3 and separates the carbon nanofibers 52 from the fine particles 55 with the growth carbon nanofibers with mechanical surface friction occurring during rotation. As shown in FIG. 1, though the carbon nanofibers 52 grow on the surfaces of the fine particles 50 like beards, they are shown with black circles (reference numeral 55) referring to for FIG. 3. (The same applies to the following). In FIG. 3, numeral 54$a$ denotes a sieve.

It is preferable that catalyst is used in order to promote growth of the carbon nanofibers. For example, as the catalyst, metal of one kind of or a combination of two or more kinds of Na, K, Mg, Ca, Sr, Ba, Cr, Mn, Fe, Co, Ni, Mo, W, Ru, Rh, Pd, Ir, Pt or lanthanoid element such as La, Ce or Pr, oxide, chloride or nitrate thereof can be used.

As alloy of the transition metal, for example, Co—Mo base catalyst metal components can be exemplified, but the present invention is not limited to these materials.

For example, thiophene as an S component can be added to the catalyst as carbon nanofiber growth accelerator. The reason why the S component is added is because it is considered that the S component has a poisoning action and contributes to activation of the catalyst.

The catalyst 51 adhered to the carbon nanofiber 52 may be removed by catalyst removing means such as acidic solution washing.

Other physical separating processes include, for example, an ultrasonic vibrating apparatus, but the present invention is not limited to this apparatus.

In FIG. 1, the carbon nanofibers 52 grow so as to push up the catalysts 51 carried on the surface of the fine particle 50, but the growth of the carbon nanofibers is not limited to such growth. As shown in FIG. 2, for example, carbon nanofibers 52 grown from catalyst carried on fine particles may occur.

In this case, the catalyst portion 51 is eventually peeled off.

In this invention, it is preferable that a void ratio of the fine particle is 30% or less in the physical separating process. This is because, when the void ratio exceeds 30%, porosity is high and wear of particle surfaces occurs in the physical separation process, and it becomes difficult to separate and recover carbon nanofibers produced inside the particles, which is not desirable.

In the present invention, when carbon nanofibers are separated, particularly, by a physical separation process, it is preferable that the fine particles are closely packed. A closely packed fine particle means a high strength fine particle having low porosity. More specifically, the void ratio of the fine particle may be 10% or less, preferably 5% or less, further preferably in a range of 3 to 5% and more preferably in a range of 1 to 3%. This is because reduction in void ratio can prevent peeling-off in fine particles during separation of the carbon nanofibers, so that carbon nanofibers which do not include impurities can be obtained.

It is preferable that the fine particles include one kind of, or a mixture of two or more kinds of, silica sand, aluminosilicate, zeolite aluminum oxide, zirconium oxide, silicon carbide, silicon nitride, limestone, dolomite, and the like, or one kind of the compounds thereof as a main component, and the main component is included in an amount of 50 weight % or more.

In particular, limestone, dolomite or material including these constituent elements is suitable for use in a separation process using acid.

Particle size of the fine particles is not limited, but it is preferable that the particle size is in a range of 0.02 to 20 mm, and particularly preferably in a range of 0.01 to 1.0 mm.

The hardness of the fine particles can be, for example, Moh's hardness of 5 or more, preferably Moh's hardness of 8 or more (old Moh's hardness). Thereby, when carbon nanofibers are separated, peeling-off on surfaces of the fine particles is prevented so that only the carbon nanofibers can be isolated.

When a fine particle 50 such as shown in FIG. 22(a) is used, since the carbon nanofibers 52 can grow only from a surface of the fine particle, separation of the carbon nanofibers 52 is easy.

On the other hand, when a porous fine particle 80 such as shown in FIG. 22(b) is used, when carbon nanofibers 52 together with a surface of the porous fine particle are peeled off due to undulation of a porous surface in separation of the carbon nanofibers 52, and the porous fine particle constitutes an impurity, this results in lower purity.

When catalysts 51 also adhere to the inside of the porous portion 81 in a porous particle 80, as shown in FIG. 22(c), and carbon nanofibers 52 grow from the catalyst, carbon nanofibers can not be isolated by a physical separation process. It is necessary to first separate the entirety of a corresponding portion (shown with a one-dot chain line in FIG. 22(c)) by a physical process, and then dissolve the same by a chemical separation process, such as use of acidic solution. As a result, the chemical dissolving work takes much labor and time. In particular, in soft fine particles with low hardness, a large amount of fine particles are peeled off during peeling-off work, which results in an increase in impurities.

By using closely packed fine particles with a high strength which are not porous in this manner, wear of the fine particles themselves is reduced in the physical separation process and the amount of catalyst can be reduced.

Separation is made easy by wear, and impurity in the product is much reduced, so that carbon nanofibers with high purity can be obtained.

When carbon nanofibers are produced using closely packed fine particles and physical separation process is performed in this manner, carbon nanofibers with impurity of 5% or less can be obtained. But when porous fine particles are used, carbon nanofibers containing impurity of 40 to 70% can only be obtained.

Since hardness becomes high by employing closely packed fine particles, peeling-off does not occur in the physical separation process and recycling is effective.

Figure 4:
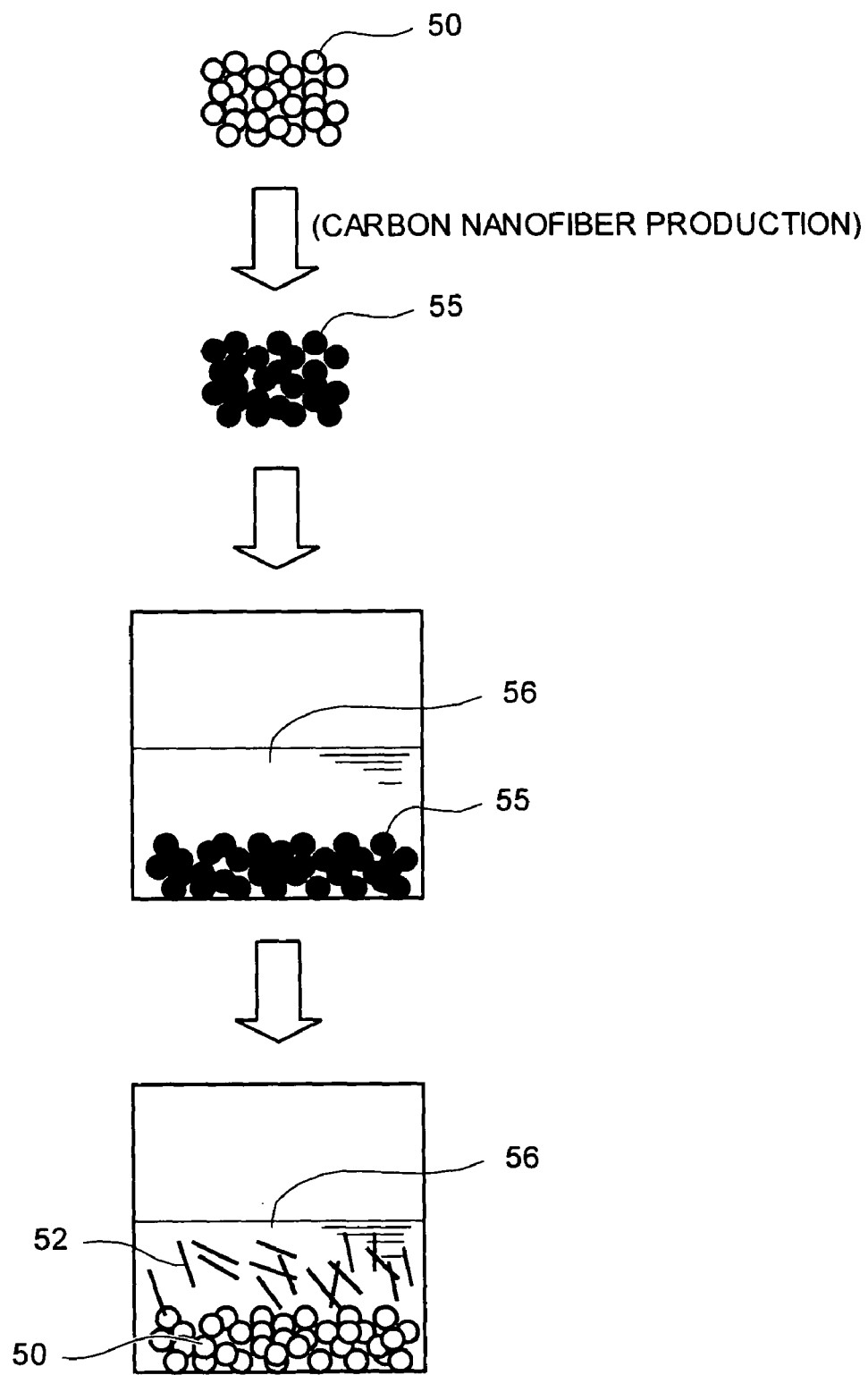
FIG. 4 is a schematic diagram of chemically separating carbon nanofibers according to an embodiment of the present invention.

FIG. 4 is a diagram which explains a chemical separation method. As shown in FIG. 4, the production method of carbon nanofibers using the chemical separation process is constituted so as to cause carbon nanofibers 52 to grow on surfaces of fine particles 50, recovering the fine particles and fine particles 55 on which carbon nanofibers have grown, separating the carbon nanofibers 52 from the surfaces of the fine particles by chemical means using acidic solution 56, and recovering the carbon nanofibers 52.

The acidic solution 56 according to the chemical separation method can include acidic solution, for example, hydrochloric acid, nitric acid, hydrofluoric acid. Further, pH of the acidic solution is 4.5 or less, preferably 4.0 or less, and further preferably, 3.5 or less.

As shown in FIG. 2, the chemical separation process using acidic solution is done so as to separate carbon nanofibers 52 by dissolving catalyst 51 in the case of growth of the carbon nanofibers 52 from catalysts 51 carried by fine particles 50. As shown in FIG. 22(a), however, even when carbon nanofibers 52 grow on surfaces of fine particles so as to push up catalysts 51, acid acts on the boundary faces between the fine particles 50 and the carbon nanofibers 52, which results in separation of the carbon nanofibers.

Figure 5:
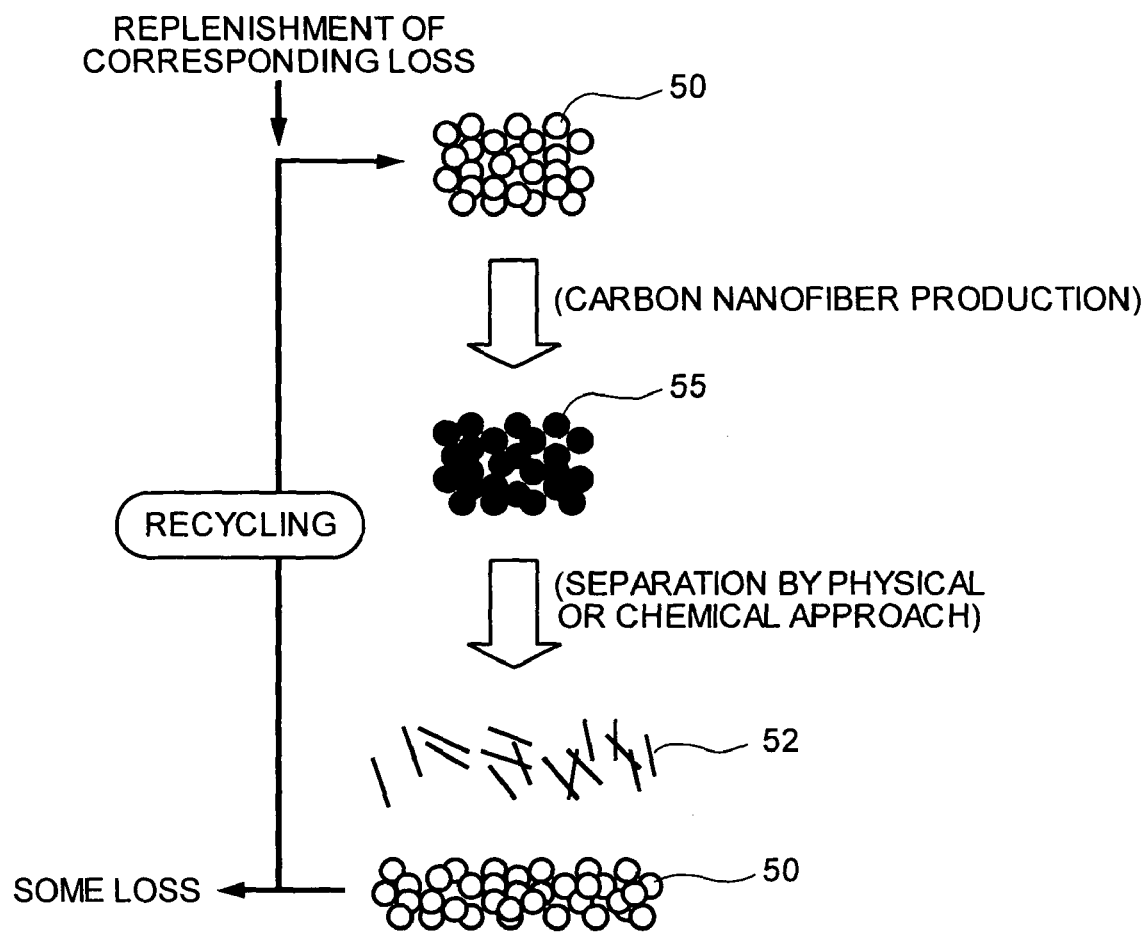
FIG. 5 is a schematic diagram of a production step of carbon nanofibers according to an embodiment of the present invention.

In the present invention, as shown in FIG. 5, the fine particles 50 from which the carbon nanofibers 52 have been separated can be recycled. Regarding some loss of the fine particles, fine particles 50 may be further replenished.

Figure 7:
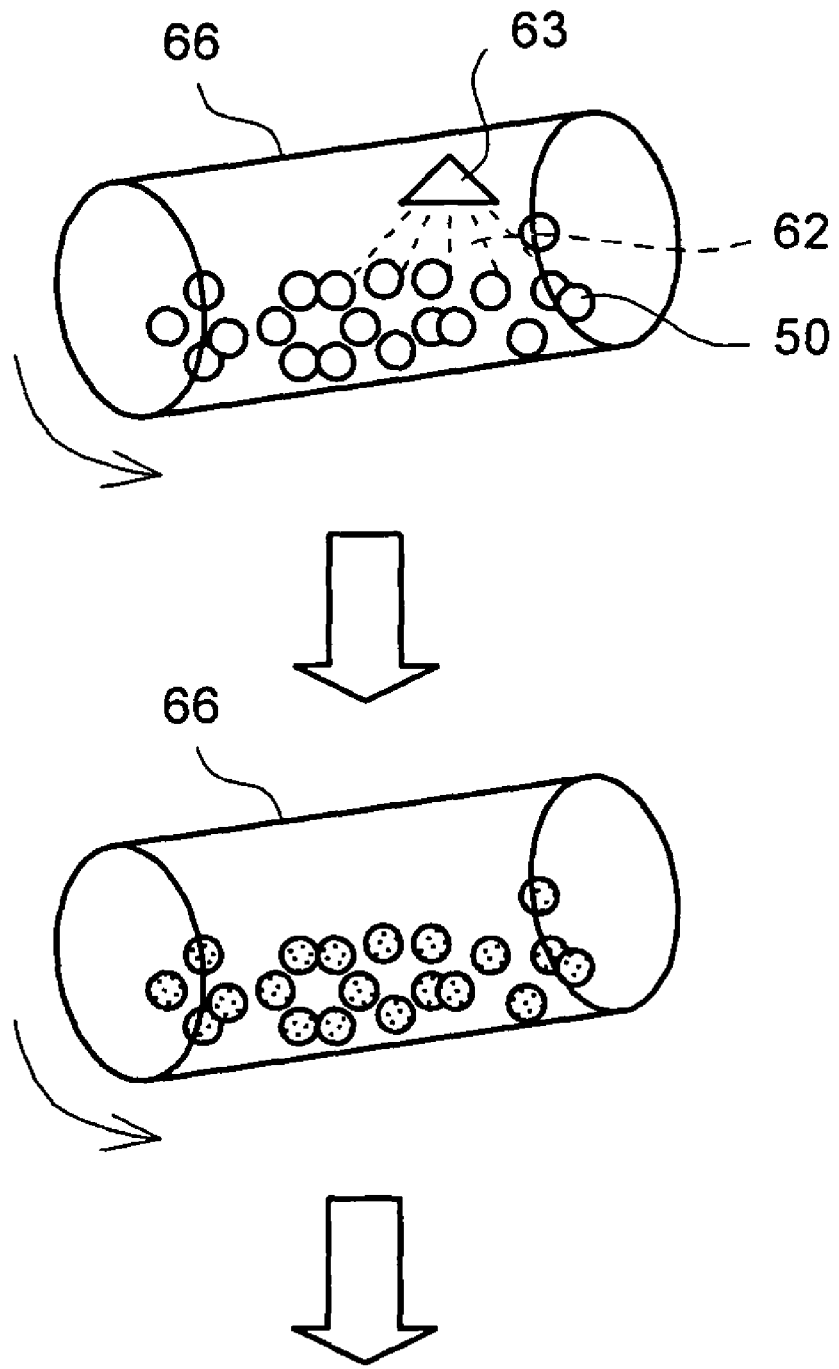
FIG. 7 is a schematic diagram of another production step of adhering fine catalyst to fine particles according to an embodiment of the present invention.

The method for causing fine particles 50 to carry catalyst 51 is not limited to a specific method, but there are methods shown in FIG. 6 or FIG. 7.

As shown in FIG. 6, first, adhesion of catalyst 51 to fine particles 50 may be achieved by charging fine particles 50 into a catalyst carrying vessel 60 or supplying them to the vessel from a fine particle supplying device, and spraying catalyst containing liquid 62 from a spraying unit 63 to carry the catalyst 51 onto surfaces of the fine particles 50. Such a constitution is employed that the catalyst is efficiently adhered to surfaces of the fine particles by supplying fluidized gas 64 into the catalyst carrying vessel 60 from a lower portion thereof to put the fine particles 50 in a fluidized state.

As shown in FIG. 7, such an arrangement may be employed that a spraying unit 63 that sprays catalyst containing liquid 62 is provided inside a rotary kiln 66 and adhesion of catalyst 51 is performed while rotating fine particles 50.

Figure 8:
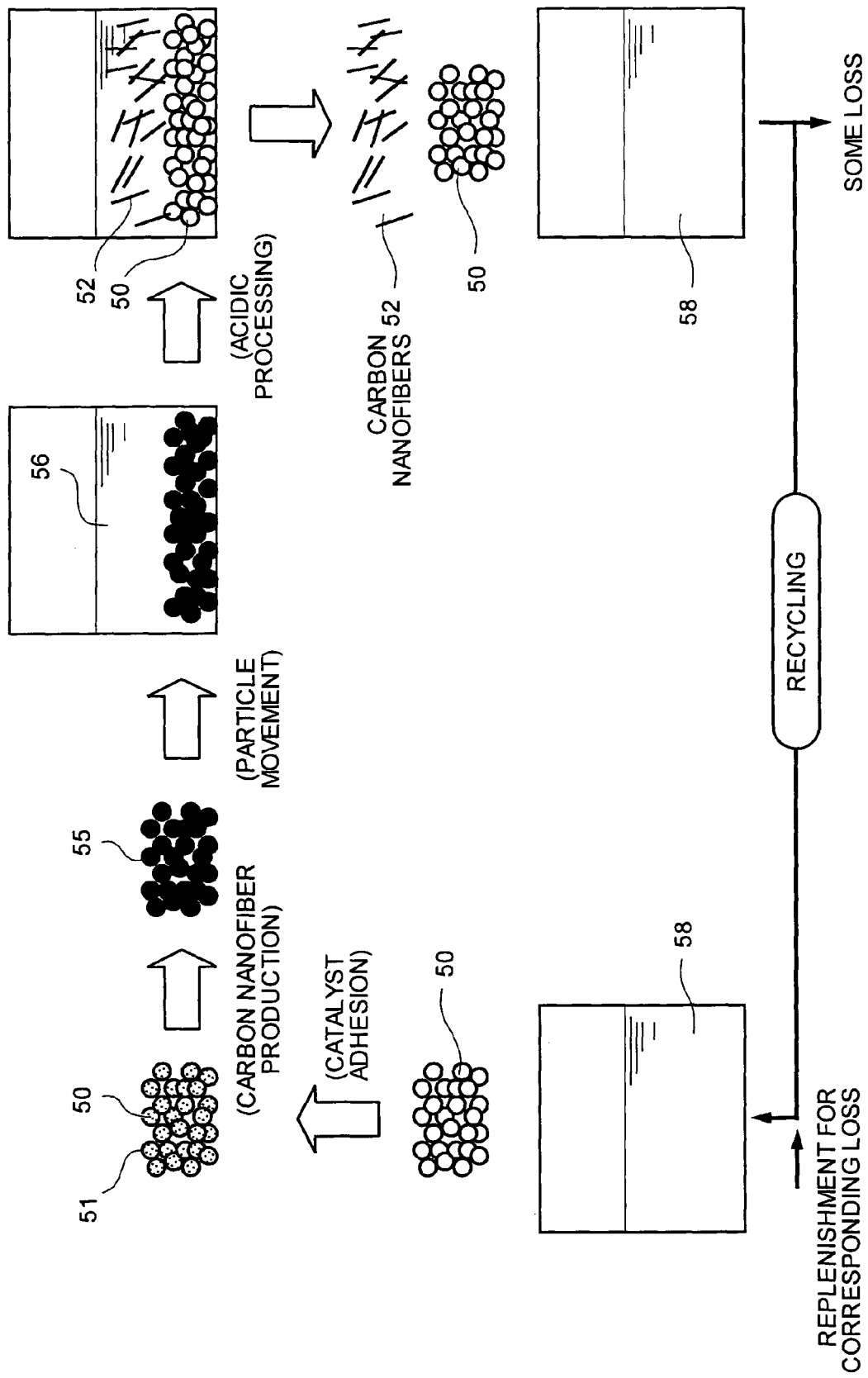
FIG. 8 is a schematic diagram of the step of recycling catalyst carried by fine particles according to an embodiment of the present invention.

As shown in FIG. 8, such an arrangement is employed that carbon nanofibers 52 are caused to grow on surfaces of the fine particles 50 via catalyst 51, the fine particles and fine particles 55 on which carbon nanofibers have grown are recovered, the carbon nanofibers 52 are separated from surfaces of the fine particles 50 by a chemical separation process using acidic solution 56, the carbon nanofibers 52 are recovered, and catalyst solution 58 resolved in the acidic solution is recycled. Regarding loss of the catalyst solution, catalyst solution 58 may be replenished.

That is, since particle diameters of the fine particles 50 are large, the fine particles are separated using a sieve with such a mesh size that carbon nanofibers 52 floating in the acidic solution 56 pass, and then the carbon nanofibers 52 are separated from the acidic solution 56. Fine particles separated after the acid process are caused to carry catalyst again to be recycled for production of the next carbon nanofibers. Further, catalyst in the acidic solution 56 can be recycled by causing fine particles 50 to carry the catalyst again.

At that time, by employing fine particles 50 with excellent acid solubility, such an arrangement may be employed that not only catalyst 51 but also the fine particles 50 are dissolved and processed so that only carbon nanofibers 52 are present in acidic solution.

Figure 9:
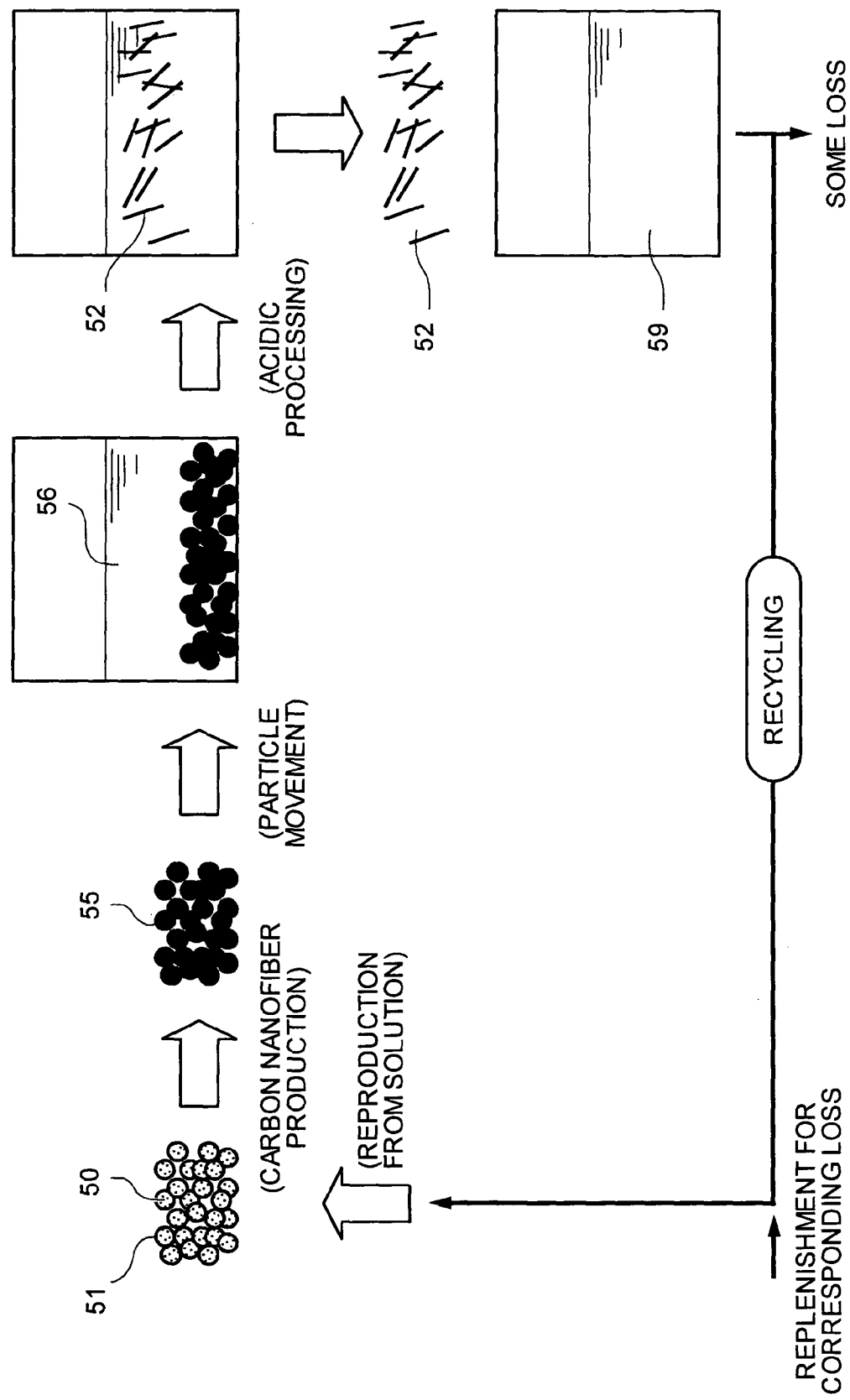
FIG. 9 is another schematic diagram of the step of recycling catalyst carried by fine particles according to an embodiment of the present invention.

This is shown in FIG. 9. As shown in FIG. 9, after carbon nanofibers 52 that are present in catalyst and fine particles dissolved solution 56 are removed, catalyst and fine particles are replenished. Next, the catalyst and fine particles dissolved solution 59 is dried. At that time, after heating and baking are conducted to obtain viscous granulates, fine particles 50 with desired particle diameters are prepared. Thereafter, catalyst component is carried onto surfaces of fine particles under a reducing atmosphere. The fine particles carrying catalyst are recycled for production of carbon nanofibers, again.

Figure 10:
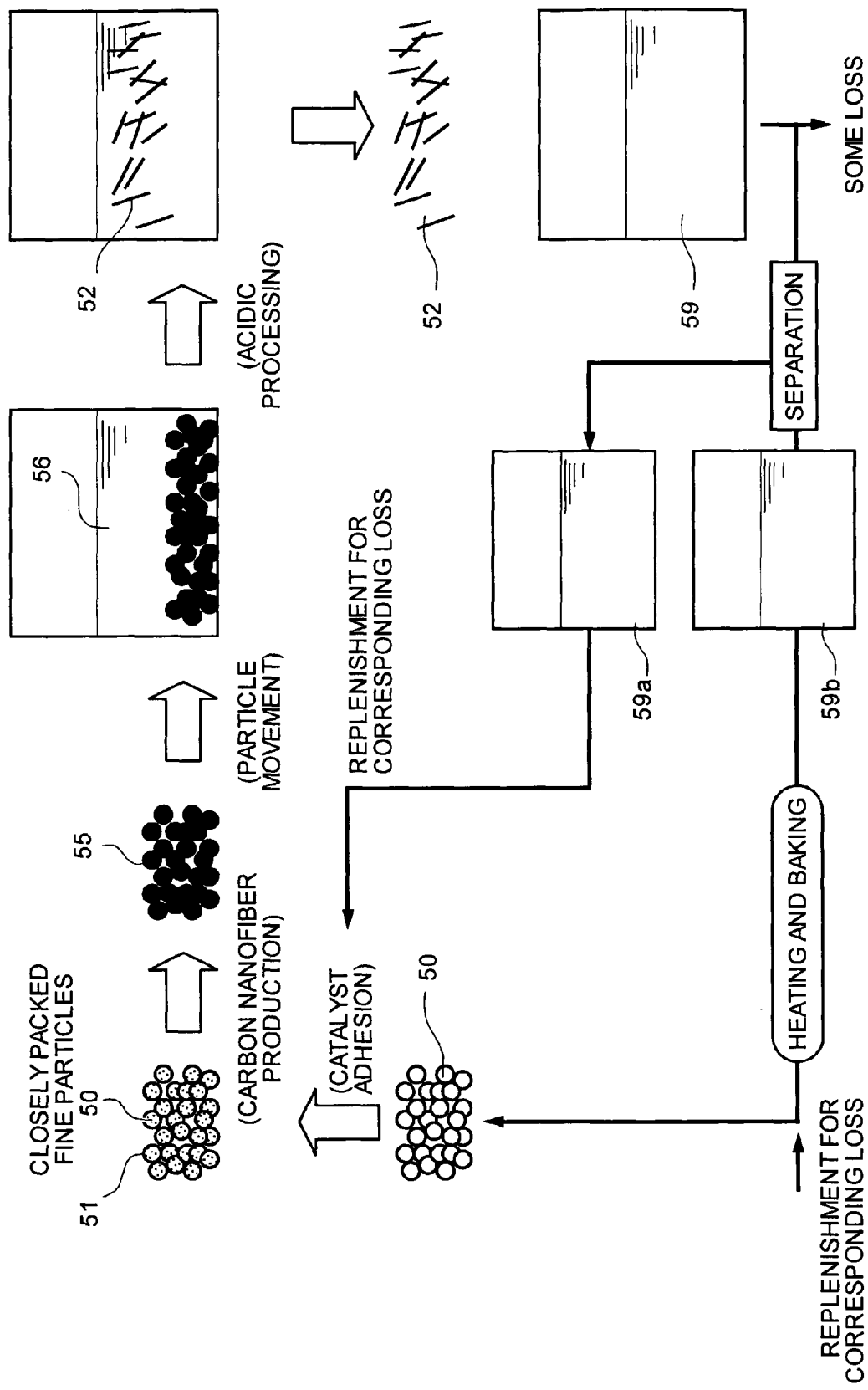
FIG. 10 is still another schematic diagram of the step of recycling catalyst carried by fine particles according to an embodiment of the present invention.

As shown in FIG. 10, after carbon nanofibers 52 present in the catalyst and fine particles dissolved solution 59 are removed, a separation process of catalyst dissolved solution 59a and fine particles dissolved solution 59b is performed. The separation process can include, for example, a separation process which depends on a difference in pH using a solubility product or a separation process utilizing an ion exchange membrane.

Catalyst and fine particles from the catalyst dissolved solution 59a and the fine particles dissolved solution 59b separated respectively are subjected to reproduction processes with respective additions of corresponding losses. The catalyst composition process can include, for example, a drying process performed for several hours at a temperature of 120° C., a high temperature baking process conducted at a temperature of 700 to 800° C. or a metallization process of catalyst conducted by a hydrogen reducing process, but it is not limited to these processes. Further, after heating and baking are performed to obtain viscous granulates from the fine particle dissolving solution 59b, fine particles 50 with desired particle diameters are produced.

Figure 11:
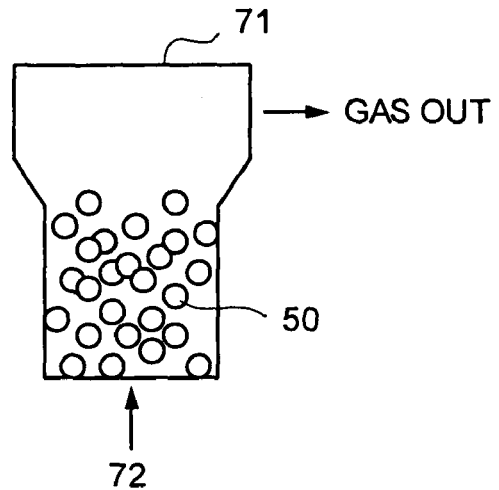
FIG. 11 is a schematic diagram of a fluidizing layer reaction system according to an embodiment of the present invention.
Figure 12:
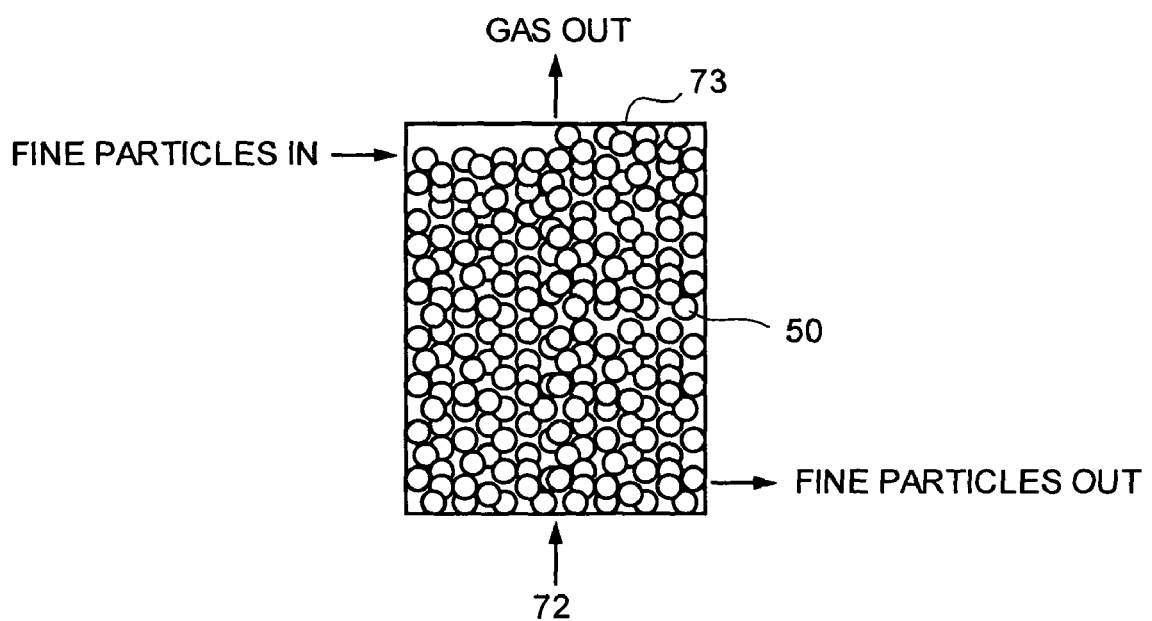
FIG. 12 is a schematic diagram of a moving bed reaction system according to an embodiment of the present invention.
Figure 13:
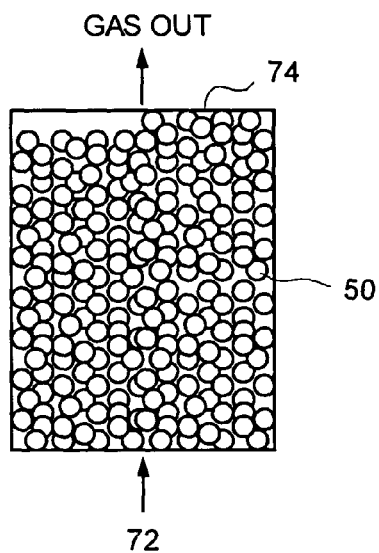
FIG. 13 is a schematic diagram of a fixed bed reaction system according to an embodiment of the present invention.
Figure 14:
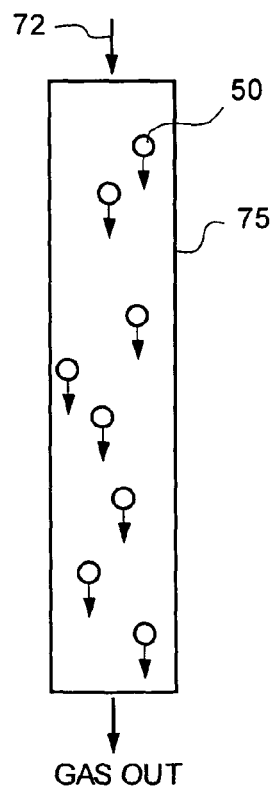
FIG. 14 is a schematic diagram of a gas flow bed reaction system according to an embodiment of the present invention.

Though the reaction method of carbon nanofibers is not limited to a specific one, examples of the production method are shown, for example, in FIG. 11 to FIG. 15. For example, a case shown in FIG. 11 is a production method of carbon nanofibers of a fluidizing layer system that charges fine particles 50 constituting fluidizing material inside a fluidizing furnace 71 to fluidize them, and feeds raw material gas 72 in the fluidizing furnace 71 from a lower portion thereof to draw out the fluidizing furnace upwardly to conduct reaction. Further, the production method may be of a circulating fluidizing bed type. A case shown in FIG. 12 is a production method of carbon nanofibers of a moving layer system that charges fine particles 50 into a moving bed furnace 73 to gradually charge fine particles and draw out portions thereof, and charges raw material gas 72 from a lower portion of the furnace to draw it upwardly to conduct the reaction. A case shown in FIG. 13 is a production method of carbon nanofibers of a fixed bed system that charges raw material gas 72 into a fixed bed furnace 74 from a lower portion thereof, and draws it out upwardly to conduct a reaction. A case shown in FIG. 14 is a production method of carbon nanofibers of a gas flow bed system that charges fine particles 50 along with raw material gas 72 from one end of a vapor phase reaction furnace 75 to conduct the reaction and recovers reaction product at the other end thereof. At that time, catalyst may be carried on fine particles in advance or catalyst may be charged separately, and the charging method of catalyst is not limited to a specific one.

Figure 15:
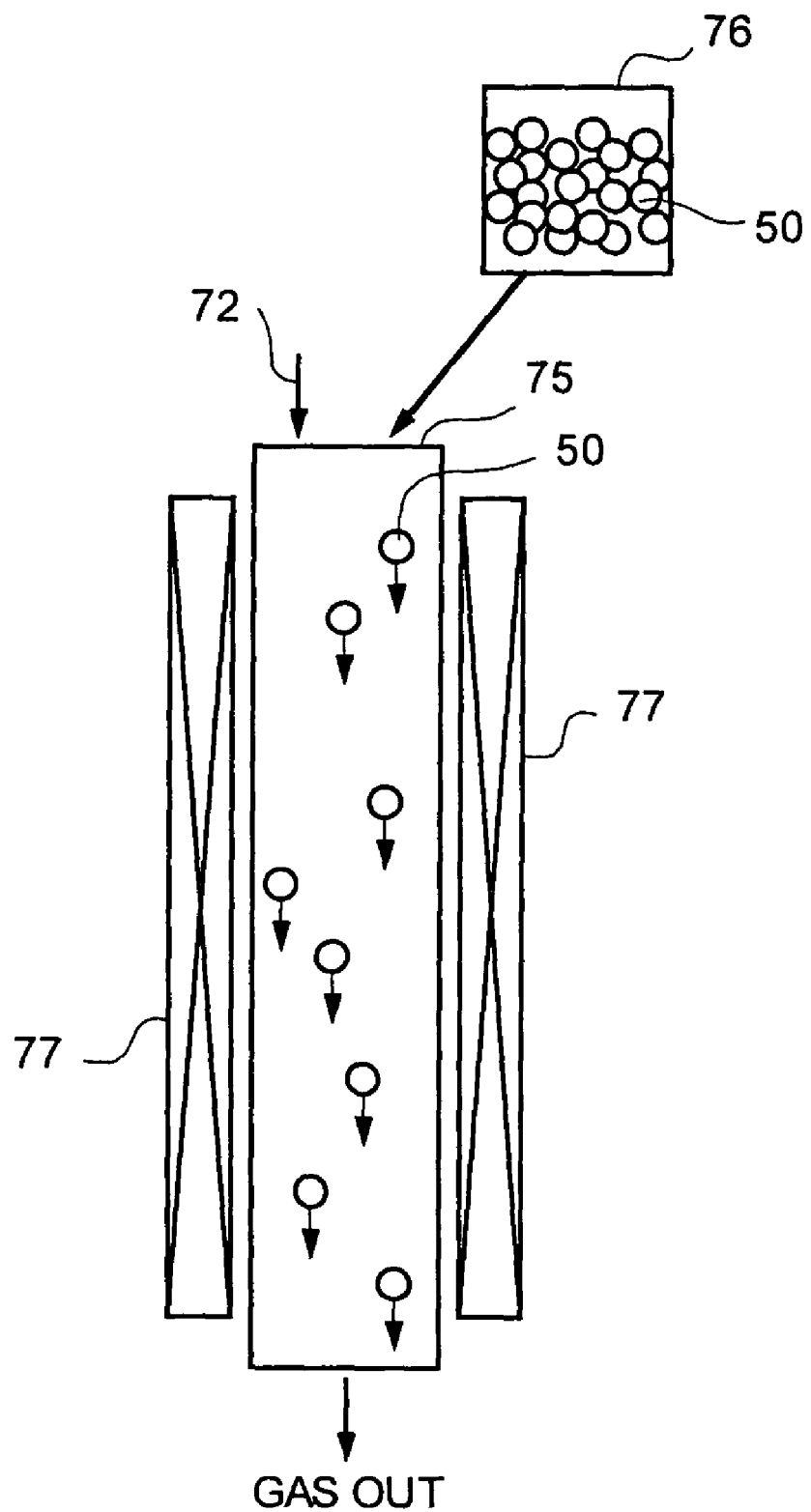
FIG. 15 is a schematic diagram of another gas flow bed reaction system according to an embodiment of the present invention.

As shown in FIG. 15, such an arrangement may be employed that fine particles 50 to be supplied inside are pre-heated in a preheating furnace 76, and they are then supplied to a gas phase reaction furnace 75 having a heating apparatus 77, so that uniformity of the reaction temperature is achieved owing to heat capacity of the fine particles preheated and a reaction is made properly.

Figure 16:
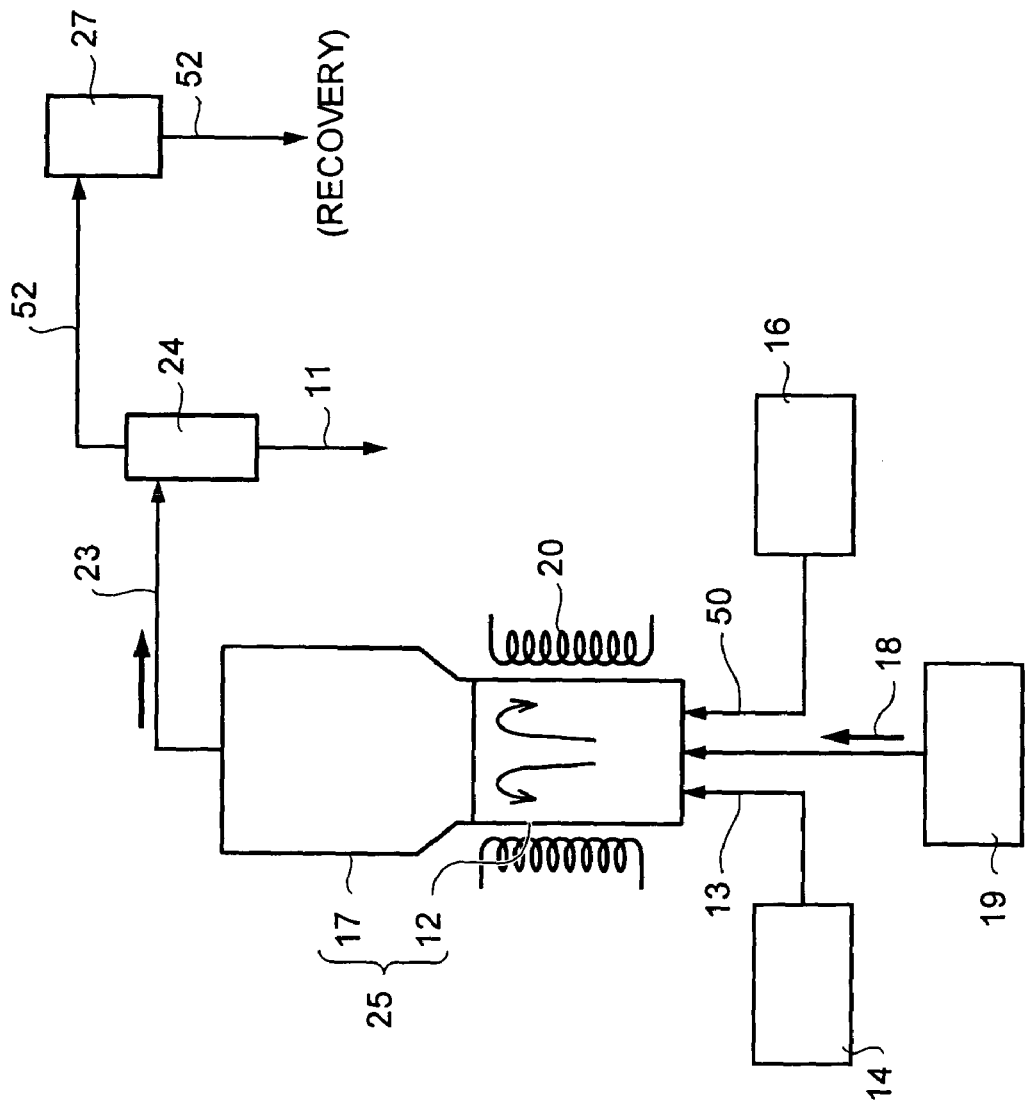
FIG. 16 is a schematic diagram of a production apparatus of carbon nanofibers according to an embodiment of the present invention.

Next, FIG. 16 is a diagram of a specific example of a carbon nanofiber production apparatus that produces carbon nanofibers. As shown in FIG. 16, the production apparatus of carbon nanofibers is provided with a fluidizing layer reaction unit 12 charged therein with fine particles carrying catalyst 51 that are fluidizing material, a raw material supplying apparatus 14 that supplies carbon material 13 that is raw material gas into the fluidizing layer reaction unit 12, a catalyst carrying fine particles supplying apparatus 16 that supplies fine particles 50 carrying catalyst 51 into the fluidizing layer reaction unit 12, a free board unit 17 having a space where the fine particles which are fluidizing material in the fluidizing layer reaction unit 12 scatter or flow down, a fluidizing gas supplying apparatus 19 that supplies fluidizing gas 18 that fluidizes the fluidizing material 11 inside, a heating apparatus 20 that heats the fluidizing layer reaction unit 12, a recovery line 23 that recovers carbon nanofibers 52 and fine particles 50 scattered from the free board unit 17, a separating apparatus 24 that separates the fine recovered particles 50 recovered in the recovery line 23 and carbon nanofibers 52 from each other, and a refining unit 27 that removes catalyst adhered to the carbon nanofibers 52.

As a fluidized bed reaction type of the fluidizing layer reaction unit 12, there are a bubble type fluidizing layer type and a jetting type fluidizing layer type, and either one thereof can be used in this invention.

In this embodiment, the fluidizing layer reaction unit 12 and the free board unit 17 constitute a fluidizing layer reaction vessel 25. Further, it is preferable that the free board unit 17 has a flow path unit area larger than that of the fluidizing layer reaction unit 12.

The carbon raw material 13 supplied from the carbon material supplying unit 14 may be any one of compounds containing carbon, and it can include not only CO and $CO_2$ but also alkanes such as methane, ethane, propane and hexane, unsaturated organic compounds such as ethylene, propylene and acetylene, aromatic compounds such as benzene or toluene, polymer materials such as polyethylene or polypropylene, or oil, or coal (including coal converted gas), but the present invention is not limited to these materials. Further, organic compounds containing not only C or H but also a S component or a Cl component may be used.

The carbon material 13 is supplied to the fluidizing layer reaction unit 12 in a gaseous state and is subjected to a uniform reaction by stirring conducted by the fine particles 50 which are the fluidizing material, thereby causing carbon nanofibers to grow. At that time, inert gas is separately introduced as fluidizing gas from the fluidizing gas supplying apparatus 19 to the fluidizing layer reaction unit 17.

Supplying the catalyst is not only performed by carrying catalyst on surfaces of fine particles in advance but also catalyst 51 may be supplied into the reaction apparatus in a liquid state where the catalyst 51 is dissolved in carbon material 13. In this case, such an arrangement may be employed that the catalyst carrying fine particle supplying apparatus 16 is simply a supplying apparatus for fine particles 50 and the raw material supplying apparatus 14 is a unit that supplies catalyst in a liquid state.

Catalyst may be supplied to the reaction apparatus in a solid or gaseous state. In this case, a catalyst supplying apparatus may be provided separately.

Carbon fibers are synthesized by setting a temperature range of 300° C. to 1300° C., and more preferably 400° C. to 1200° C. and causing carbon material such as benzene to contact with catalyst for a fixed time in mixed gas with a hydrogen partial pressure of 0% to 90%.

As the separating apparatus 24, not only a cyclone but also, for example, a known separating apparatus such as a bug filter, a ceramic filter or a sieve can be used.

Such an arrangement is employed that the carbon nanofibers 22 separated by the separating apparatus 24 are recovered as carbon nanofiber pure product by the refining unit 27 separating adhered catalyst from the carbon nanofibers. As the refining unit 27, for example, a known filtering unit such as a bug filter can be used.

In the fluidizing layer reaction apparatus, thus, fine particles carrying catalyst are used as the fluidizing material, carbon nanofibers are caused to grow on surfaces of carbon nanofibers, carbon nanofibers are separated by collisions among the fine particles caused simultaneously with the growth of the carbon nanofibers, so that the carbon nanofibers can be recovered as product.

Catalyst 51 may be separately supplied to the fluidizing layer reaction unit 12. Thereby, catalyst of an amount exceeding the amount of catalyst carried by the fine particles is present, which can result in improvement of a reaction efficiency.

Figure 26:
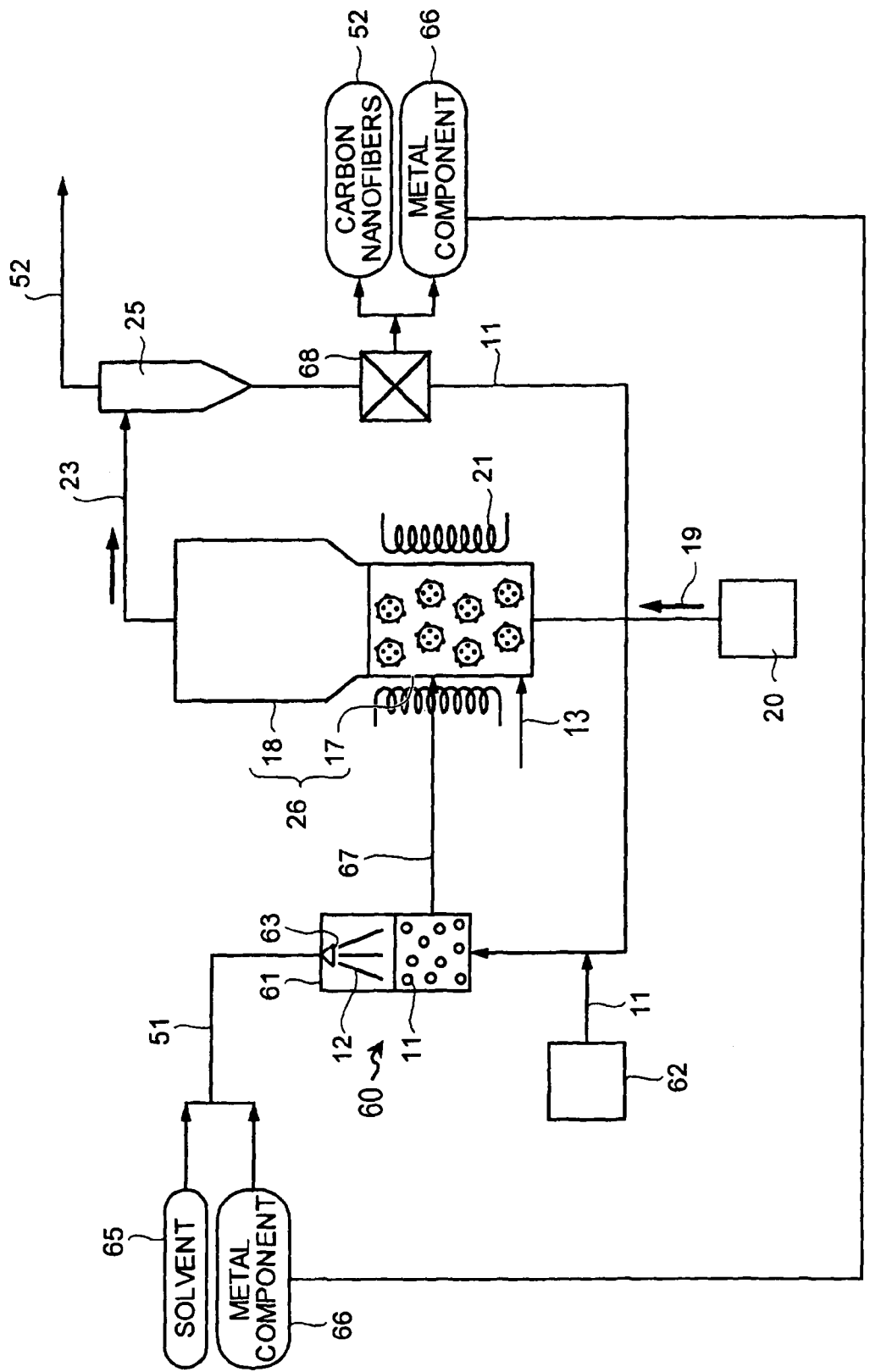
FIG. 26 is a schematic diagram of another producing apparatus of carbon nanofibers.

An outline of another production apparatus of carbon nanofibers is shown in FIG. 26. The apparatus of this embodiment is constituted so as to adjust fine particles carrying catalyst, which is supplied to the fluidizing layer reaction unit 12, in a catalyst carrying apparatus in advance and supply the adjusted fine particles to the fluidizing layer reaction unit 12. Similar members to the production method of carbon nanofibers shown in FIG. 16, already described will be omitted in following discussion.

As shown in FIG. 26, the production apparatus of carbon nanofibers according to this embodiment is provided with a catalyst carrying apparatus 60 that causes fluidizing material 11 to carry catalyst 12, the fluidizing layer reaction unit 17 that supplies the catalyst carrying fluidizing material 67 carrying catalyst 51 obtained in the catalyst carrying apparatus 60 and carbon material 13 to produce carbon nanofibers, the free board unit 18 having a space that communicates with the fluidizing layer reaction unit 17, through which the fluidizing material inside the fluidizing layer reaction unit scatters and flows down, a fluidizing gas supplying apparatus 20 that introduces fluidizing gas 19 fluidizing the catalyst carrying fluidizing material 14 into the fluidizing layer reaction unit 17 to supply it thereto, heating apparatus 21 that heats the fluidizing layer reaction unit 17, the recovery line 23 that recovers catalyst carrying fluidizing material scattered from the free board unit 18, which has grown carbon nanofibers, and a cyclone that is the separating apparatus 25 separating the carbon nanofibers 52 from the fluidizing material recovered in the recovery line 23.

The catalyst carrying apparatus 60 is provided with a fluidizing material supplying apparatus 62 that supplies the fluidizing material 11 into a carrying vessel main body 61, and a spraying unit 63 that sprays catalyst 12 to the fluidizing material 11 supplied into the carrying vessel main body 61.

Figure 27:
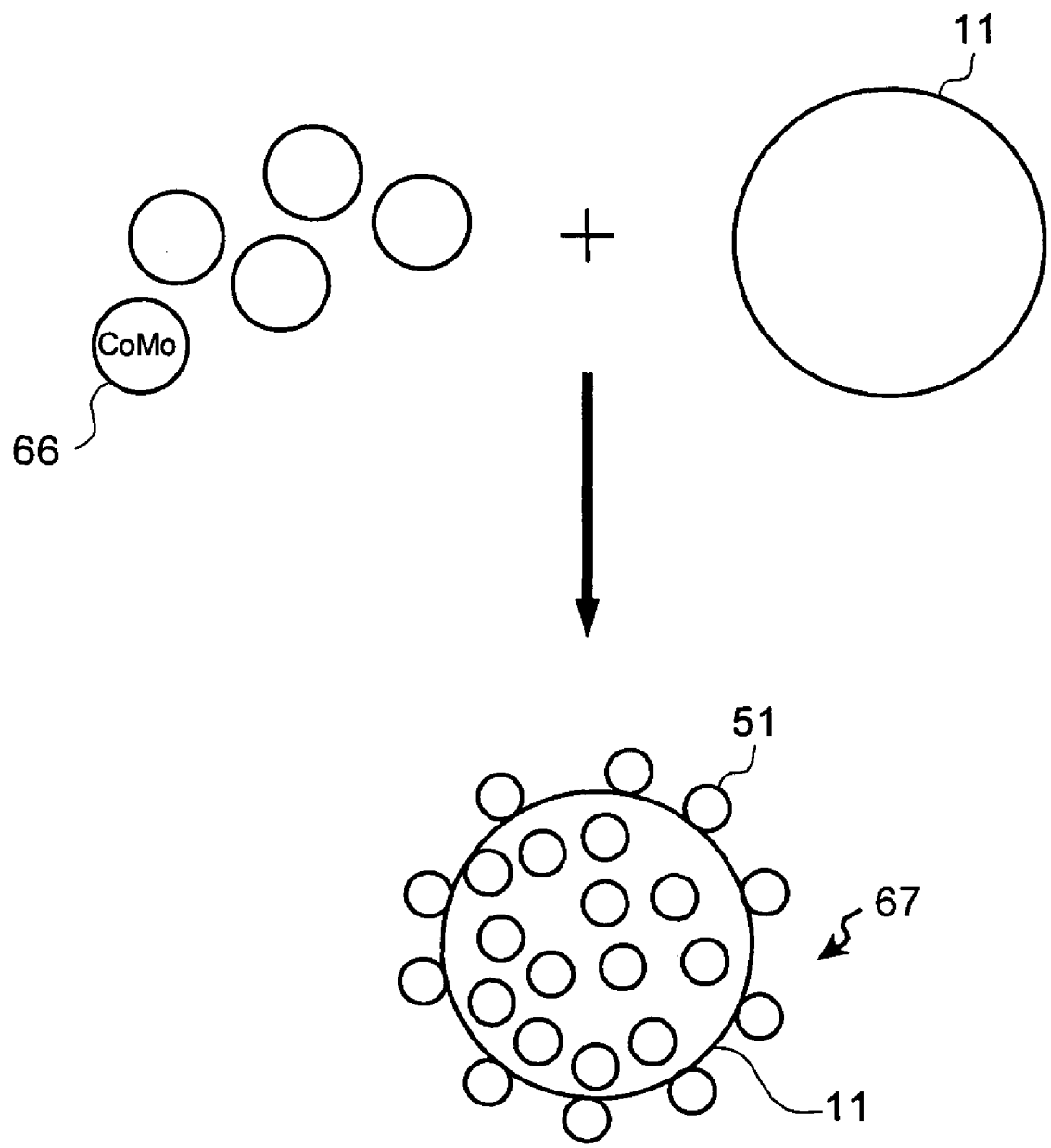
FIG. 27 is a diagram of a process of producing catalyst-carrying fluidizing material from catalyst and fluidizing material.

In the carrying apparatus shown in FIG. 27, an aspect where catalyst is carried on the fluidizing material is illustrated. As shown in FIG. 26 and FIG. 27, such an arrangement is employed that catalyst carrying fluidizing material 67 carrying catalyst 51 can be obtained by spraying catalyst 51 consisting essentially of metal components 66 dispersed in solvent 65 to the fluidizing material 11 separately supplied by the fluidizing material supplying apparatus 62 from the spraying unit 63.

The carbon nanofibers 52 grown on the catalyst 12 carried on the fluidizing material 22 separated by the cyclone which is the separating apparatus 25 are separated into the carbon nanofibers 52, the metal components 66 and the fluidizing material 11 by separating apparatus 68 separately set. The separated metal components 66 are recycled as raw material for catalyst again.

In this embodiment, thus, since the catalyst 51 is carried on the fluidizing material 11 in advance to prepare the catalyst carrying fluidizing material 67, which is supplied to the fluidizing layer reaction unit 17, uniform reaction of carbon raw material can be conducted within the fluidizing layer and carbon nanofibers 52 can be produced stably.

Figure 17:
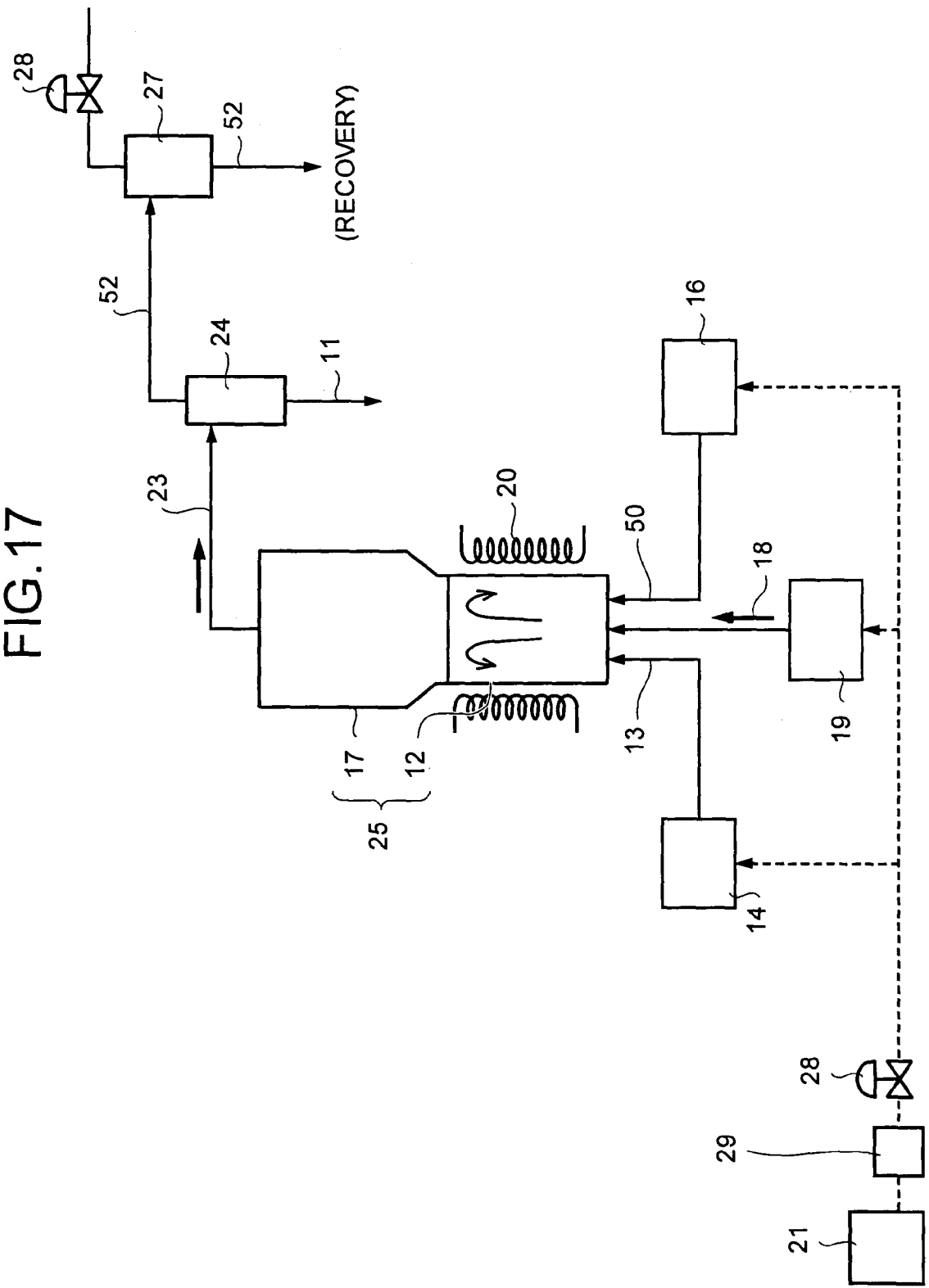
FIG. 17 is a schematic diagram of another production apparatus of carbon nanofibers according to an embodiment of the present invention.

As shown in FIG. 17, by providing a pressurizing unit 21 that pressurizes the interior of the fluidizing layer reaction unit 12, a pressurizing condition can be achieved therein. By setting the fluidizing layer reaction unit 12 to the pressurized condition, reaction efficiency can be improved and a production efficiency of carbon nanofibers can also be improved.

The pressurizing unit 21 can include, for example, liquefied nitrogen, and the fluidizing material supplying apparatus 26, the raw material supplying apparatus 14, the fluidizing gas supplying apparatus 19, and the catalyst carrying particle supplying apparatus 16 are pressurized by a pressure-adjusting valve 28 and a carburetor 29.

The pressurizing condition meets 0.01 MPa or more, preferably 0.5 MPa, and more preferably 2 MPa. It is preferable that the upper limit is set to 3 MPa. By setting the pressurizing condition to 0.01 MPa or more, a fast reaction speed can be achieved so that the reaction efficiency can be improved. A deposition condition for carbon nanofibers can be controlled according to the pressurized condition. When the pressurized condition exceeds 3 MPa, a pressure proof reference for apparatuses and peripheral devices becomes high and manufacturing costs increase, which is not desirable. By setting the interior of the fluidizing layer reaction unit 12 to the pressurizing condition in this manner, the reaction efficiency can be improved.

Figure 18:
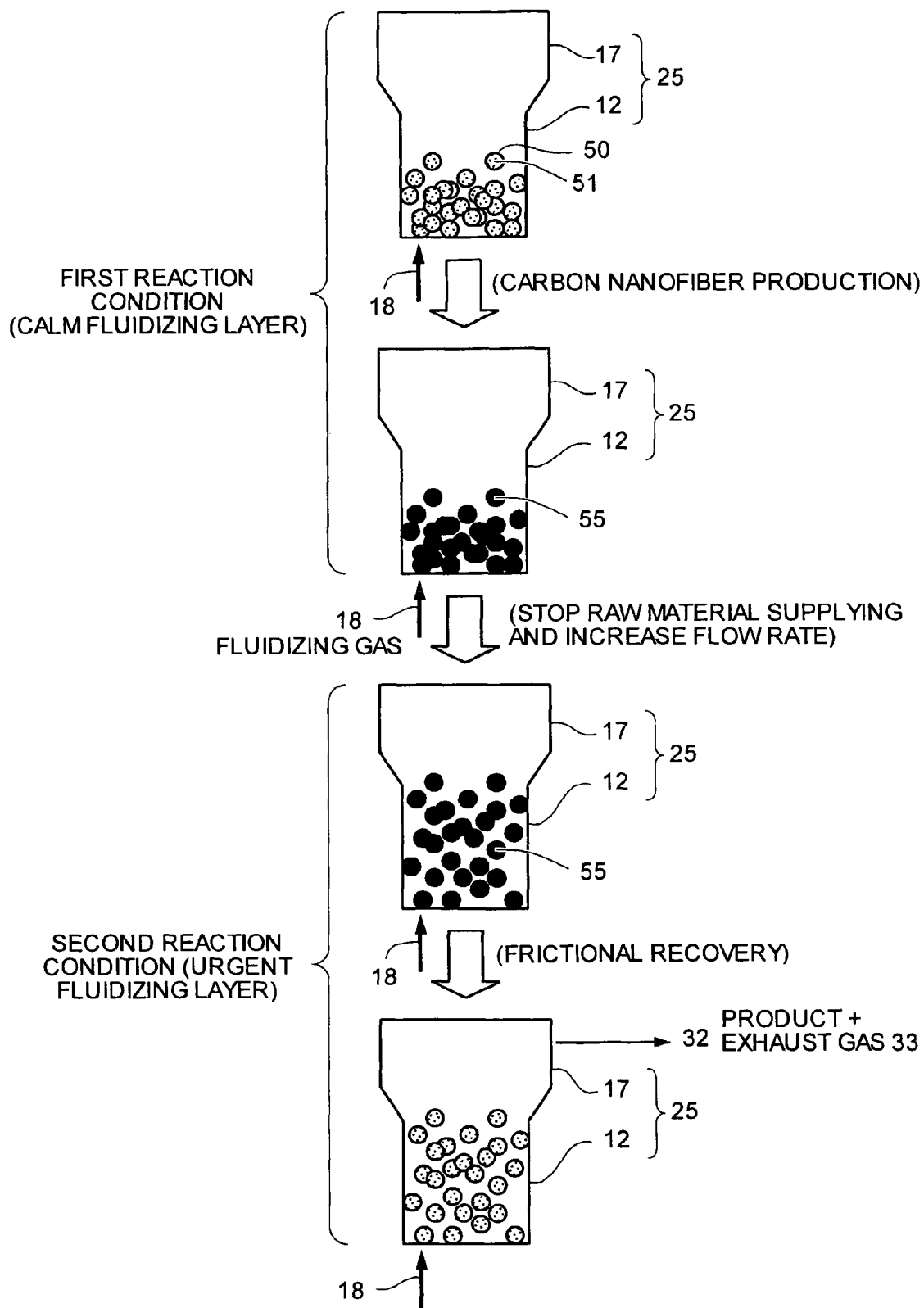
FIG. 18 is a schematic diagram of another fluidizing layer reaction system with different fluidizing conditions according to an embodiment of the present invention.

As shown in FIG. 18, different reaction conditions may be set such that a calm fluidizing layer is formed under a first reaction conditions by changing a flow rate of the fluidizing gas 18 supplied to the fluidizing layer reaction unit 12 and an urgent fluidizing layer is formed under second reaction conditions.

Thereby, after reaction is caused to progress in such a state that the fine particles stay in the calm fluidizing layer for a fixed time, the fine particles are moved to the urgent fluidizing layer, where the fine particles are violently stirred by fluidizing gas 18 with a rapid flow rate to cause wear among the fine particles, so that carbon nanofibers 52 produced on surfaces of the fine particles are separated and discharged externally as product 32 together with exhaust gas 33, and the carbon nanofibers may be recovered.

Figure 44:
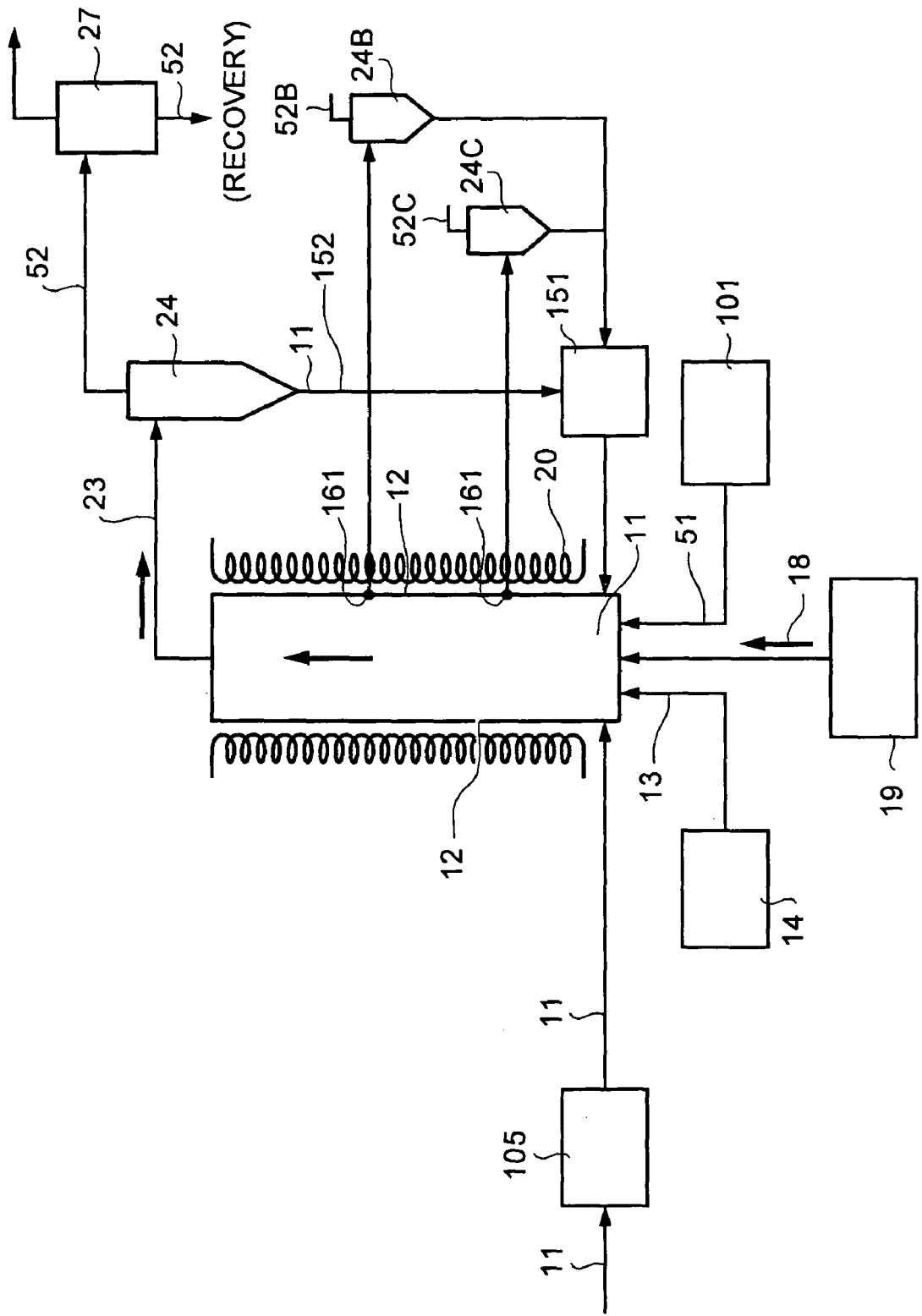
FIG. 44 is a schematic diagram of still another production apparatus of carbon nanofibers.

As shown in FIG. 44, for example, when the particle diameter is in a range of 50 to 60 μm, a reaction condition for the calm fluidizing layer means a flow rate in a region from a uniform phase fluidization of about 0.002 to 0.04 m/s to a low flow rate side in a bubble fluidization, while reaction conditions for the urgent fluidizing layer means a flow rate ranging from a turbulence fluidization of about 0.1 to 1.0 m/s to a high flow rate side in the bubble fluidization.

Figure 19:
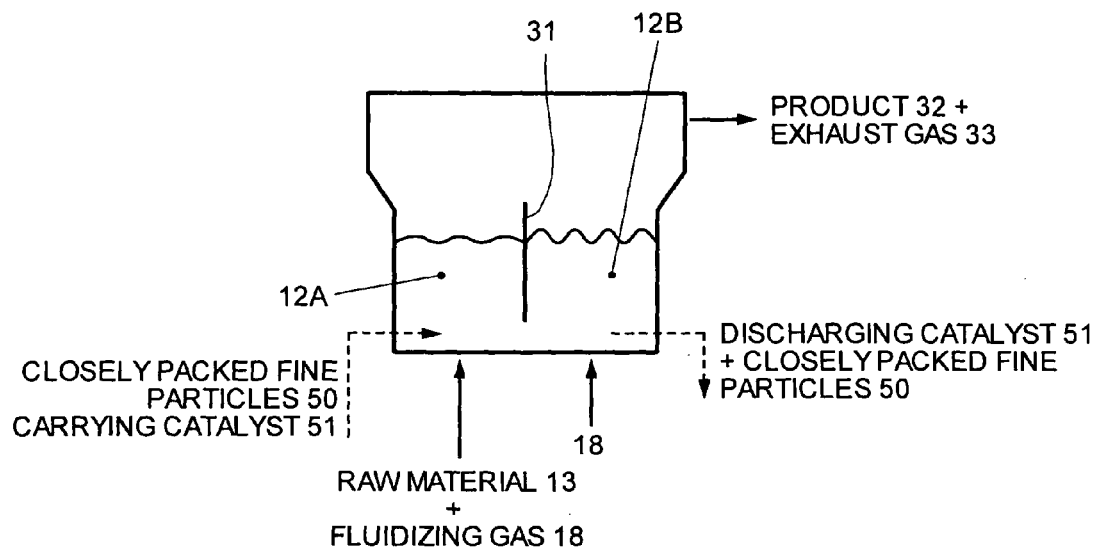
FIG. 19 is a schematic diagram of still another fluidizing layer reaction system with different fluidizing conditions according to an embodiment of the present invention.

As shown in FIG. 19, such an arrangement may be employed that interior of the fluidizing layer reaction unit 12 is partitioned to two portions by a partition member 31, and reaction conditions are made different by changing the flow rate of the fluidizing gas 18 such that one portion is a calm fluidizing layer 12A and the other portion is an urgent fluidizing layer 12B. Thereby, after reaction is caused to progress in such a state that the fine particles stay in the calm fluidizing layer 12A for a fixed time, the fine particles are moved to the urgent fluidizing layer 12B, where the fine particles are violently stirred by fluidizing gas 18 with a rapid flow rate to cause wear among the fine particles, so that carbon nanofibers 52 produced on surfaces of the fine particles are separated and discharged externally as product 32 together with exhaust gas 33, and the carbon nanofibers 52 may be recovered.

Figure 20:
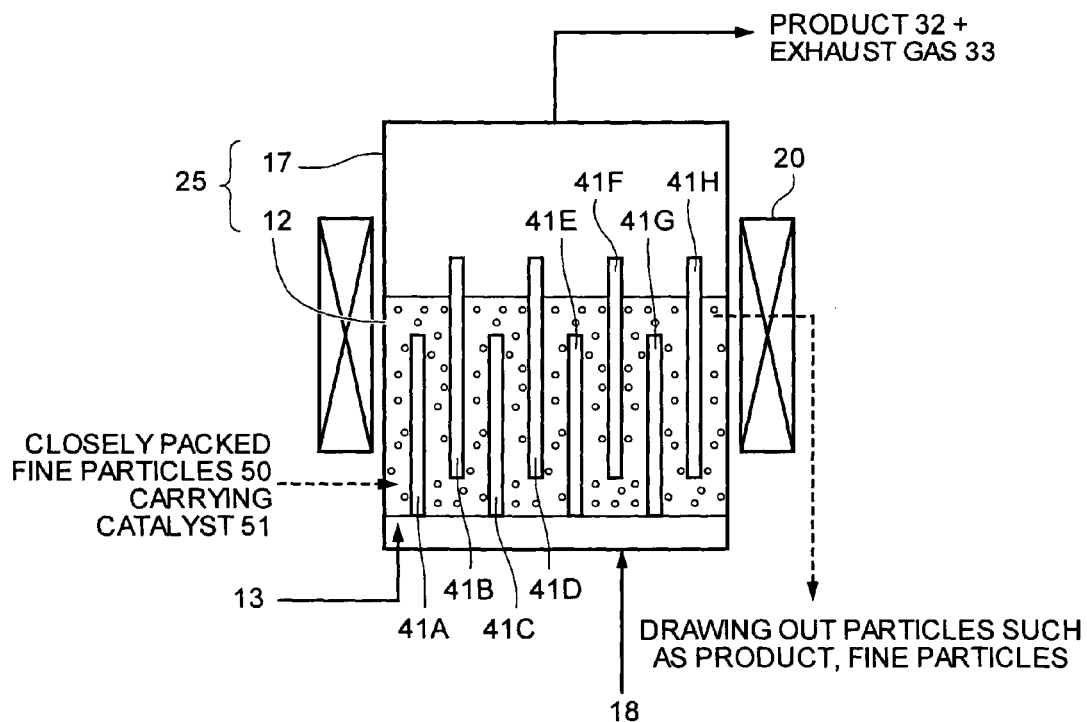
FIG. 20 is a schematic diagram of still another fluidizing layer reaction system with different fluidizing conditions according to an embodiment.

As shown in FIG. 20, such an arrangement may be employed that the interior of the fluidizing layer reaction unit 12 is partitioned to a plurality of portions by partition plates 41A to 41H so that a staying time distribution of fine particles in each fluidizing layer is made small.

Figure 21:
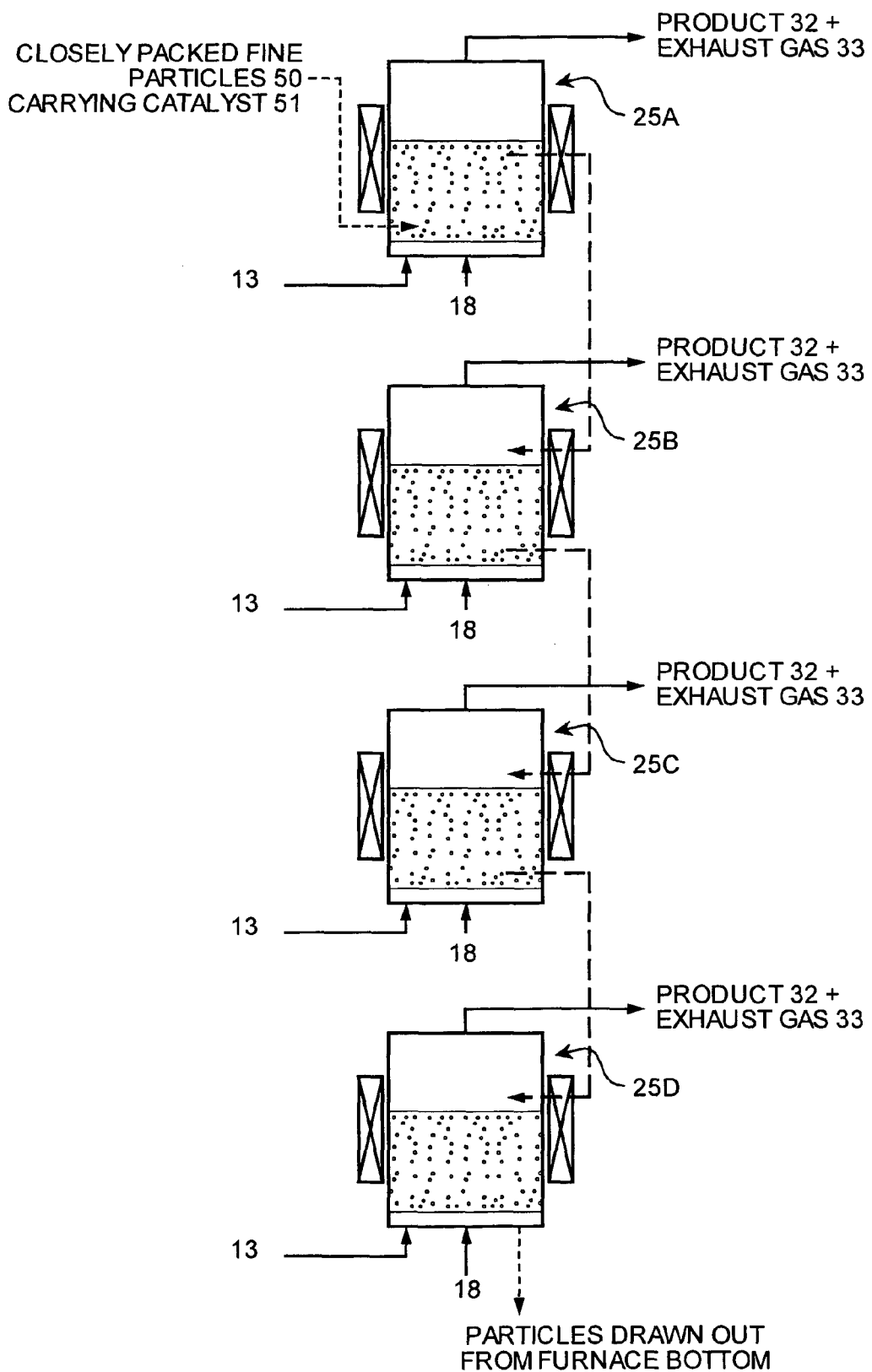
FIG. 21 is a schematic diagram of still another fluidizing layer reaction system with different fluidizing conditions according to an embodiment of the present invention.

As shown in FIG. 21, such an arrangement may be employed that a plurality of fluidizing layer reaction containers 25A to 25D are provided and reacted particles are gradually drawn out of each fluidizing layer reaction containers 25A to 25D, so that a particle staying time distribution is made small. Such an arrangement is employed that drawing-out of particles is conducted from a furnace bottom portion of the fluidizing layer reaction container 25D.

Such an arrangement is employed that the product 32 and the exhaust gas 33 are individually recovered from each fluidizing layer reaction container and carbon nanofibers are refined.

Figure 23:
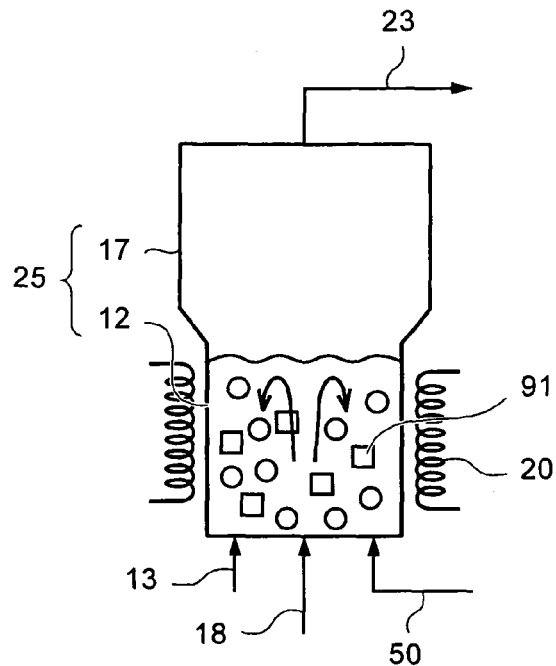
FIG. 23 is a schematic diagram of another fluidizing layer reaction apparatus according to an embodiment of the present invention.

As shown in FIG. 23, such an arrangement may be employed that additive particles 91 for peeling off carbon nanofibers that are different in shape, size and material from the catalysts are charged into the fluidizing layer reaction unit 12 so that carbon nanofibers are separated.

The additive particles 91 for peeling off carbon nanofibers may be prepared by properly combining additive particles which are equal in shape to the catalysts but different in diameter therefrom, ones which are different in shape therefrom, ones which are different in material therefrom, and ones which are different in particle diameter therefrom with one another.

For example, when the shape of catalyst particles is spherical, additive particles may be cubic. With such an arrangement, when particles contact with one another, local collision cause a large impact partially, which promotes peeling-off of carbon nanofibers from the catalyst particles.

For example, such an arrangement may be employed that fine particles are made of high strength ceramics and additive particles 91 are columns made from stainless steel. In the fluidizing layer reaction unit 12, the additive particles 91 of the stainless steel column impact on carbon nanofibers to promote peeling-off. On the other hand, since additive particles 91 of the stainless column are softer than the ceramics with high strength, the high strength ceramics are prevented from being worn. Since thin pieces of stainless steel are included in particles scattered form the fluidizing layer and thin pieces of the high strength ceramics are reduced, the carbon nanofiber concentration can be improved easily by acid processing scattered particles.

By using magnetic material (for example, cobalt-base alloy material) as the additive particles for peeling-off, the purity of carbon nanofibers can be improved by separation utilizing magnetic force.

Such an arrangement can be employed that, as the additive particles, ones having particle diameters smaller than those of fine particles are used to form a fluidizing layer, and fine particles adhered with catalysts are supplied from an upper portion of the fluidizing layer, and carbon nanofibers are caused to grow while large catalyst particles are settling, so that carbon nanofibers are peeled off. A settling time can be controlled according to a difference of particle diameter between the particles so that the reaction time can be adjusted.

Such an arrangement can be employed that an eddy flow is formed in advance near a lower end of the fluidizing layer reaction unit 12, and when catalyst particles with grown carbon nanofibers settles, collision among particles are promoted by impact of the eddy flow, so that peeling-off of the carbon nanofibers are promoted. Fluidizing may be supplied in a tangential direction in order to form the eddy flow, and for example, an eddy flow perforated plate may be formed on a lower portion side of the fluidizing layer reaction unit 12.

By charging additive particles for peeling-off inside the reaction layer, wearing promotion can be achieved in the fluidizing layer reaction, and by using additive particles made of stainless steel or the like and dissolved in acid at a time of separation, a separation efficiency is increased so that improvement in impurity of carbon nanofibers can be attained. By changing particle diameters of fine particles properly, control of staying time of the fine particles carrying catalysts inside the fluidizing layer can be made possible so that the reaction time can be controlled.

By forming the additive particles from magnetic material, separation utilizing magnetic force can be made possible after the particles are recovered.

Figure 24:
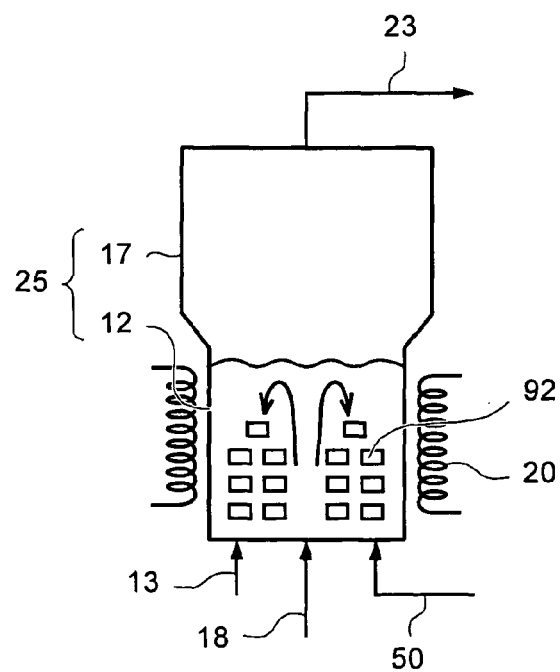
FIG. 24 is a schematic diagram of still another fluidizing layer reaction apparatus according to an embodiment of the present invention.

As shown in FIG. 24, by arranging baffles 92, which are collision plates, in a direction perpendicular to a fluidization direction inside the fluidizing layer reaction unit 12, the number of collisions is increased during fluidization so that a peeling-off efficiency of carbon nanofibers is improved.

The baffle plate 92 may be constituted so as to also function as a heat transfer tube heating the interior of the fluidizing layer reaction unit.

Figure 25:
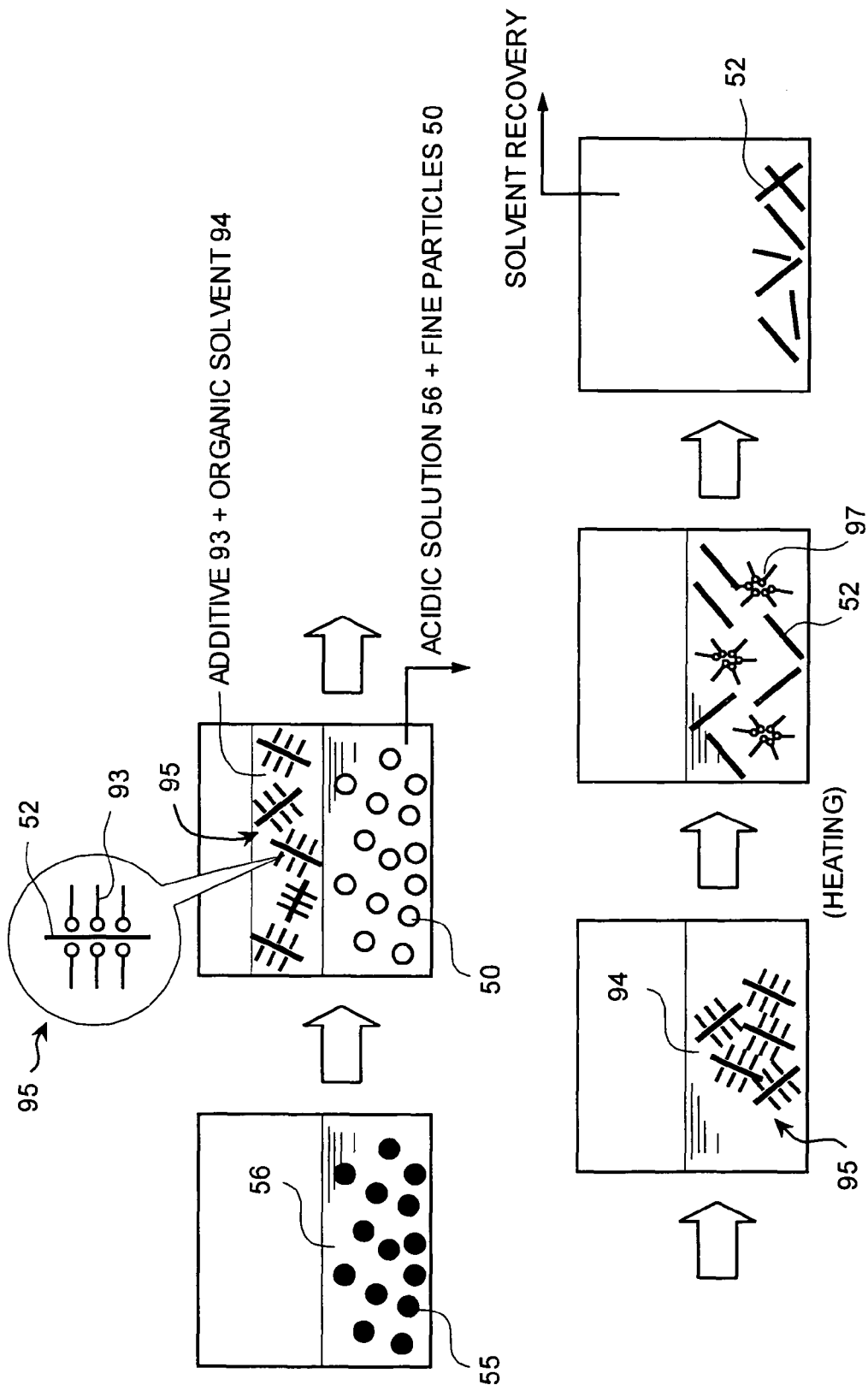
FIG. 25 is a peeling step diagram of carbon nanofibers according to an embodiment of the present invention.

As shown in FIG. 25, such an arrangement may be employed that fine particles 55 with carbon nanofibers grown by the reaction are recovered to be washed with acidic solution 56, organic compound solution 96 obtained by mixing additives 93 having functional groups with high affinity with carbon nanofibers or having functional groups with lipophilic property and organic compound 94 which is liquid at room temperature is then added in acidic solution 56 including produced carbon nanofibers, carbon nanofiber dispersion 95 enclosed by the additive 93 is dispersed in the organic compound solution 96, acidic solution 56 and fine particles 50 from which the carbon nanofibers have been peeled off are then removed, organic compound solution including the carbon nanofiber dispersion 95 is heated, the additives 93 which are micelle particles 97 constituted of aggregation of the additives and the carbon nanofibers 52 are separated, and thereafter the additives 93 and the organic solvent 94 are recovered to obtain pure product carbon nanofibers 52.

It is preferable that a functional group with a high affinity with carbon nanofibers in a compound having a polynuclear aromatic functional group is used. The compound having a polynuclear aromatic functional group includes, for example, either one of anthracene, pyrene and chrysene, or a mixture thereof. The organic compound which is liquefied at room temperature includes, for example, either one of normal hexane, toluene, tetrahydrofuran, dimethylformamide, chloromethane, and the like, or a combination of at least two thereof.

By using additives whose affinity between the organic compound and the carbon nanofibers varies according to temperature and by elevating the temperature, the affinity between the additives and the carbon nanofibers is lost and the additives 96 aggregated in the micelle state are dissolved in the organic solvent 94 so that carbon nanofibers are isolated. Thereafter, the organic solvent and the additives are vaporized and recovered. As a result, the carbon nanofibers can be isolated and the additives can also be recovered, so that the additives can be recycled.

As described above, according to the present invention, by producing carbon nanofibers using fine particles, carbon nanofibers with a high purity can be produced efficiently with a high yield. As a result, an industrial mass production of carbon nanofibers is made possible, and inexpensive carbon nanofibers can be produced.

Next, the case when catalysts are individually charged in a reaction apparatus using a fluidizing layer to produce carbon nanofibers will be explained with reference to FIG. 28. Similar members in the carbon nanofiber producing apparatus already explained with reference to FIG. 16 will be omitted from the following discussion.

Figure 28:
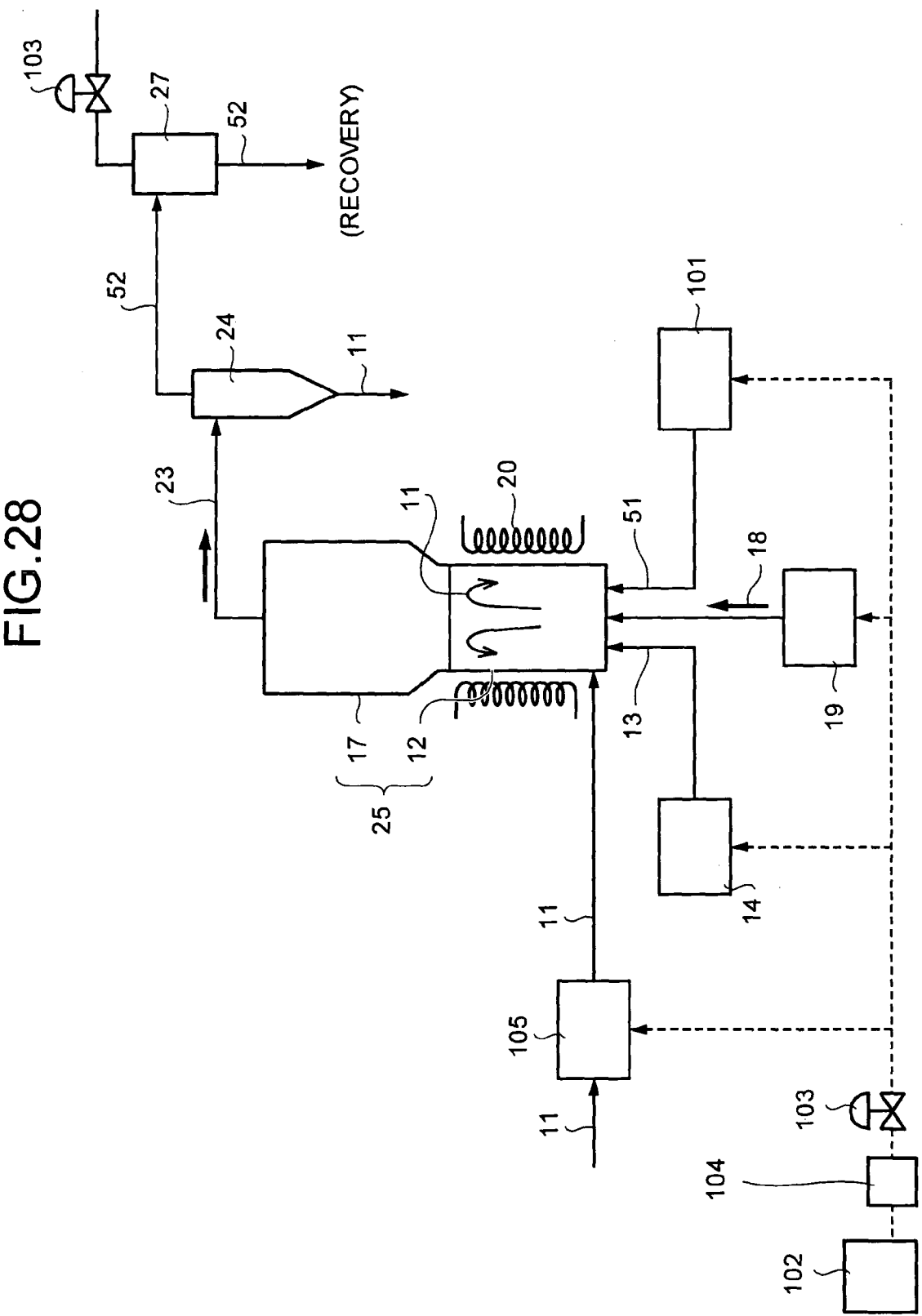
FIG. 28 is a schematic diagram of still another production apparatus of carbon nanofibers.

FIG. 28 is a diagram of another example of an apparatus for producing carbon nanofibers.

As shown in FIG. 28, the production apparatus of carbon nanofibers is provided with the fluidizing layer reaction unit 12 in which fluidizing material 11 has been charged, the raw carbon material supplying apparatus 14 that supplies raw material 13 into the fluidizing layer reaction unit 12, a catalyst supplying apparatus 101 that supplies metal catalysts 51 into the fluidizing layer reaction unit 12, the free board unit 17 having a space in which fluidizing material 11 inside the fluidizing layer reaction unit 12 scatters and flow down, the fluidizing gas supplying apparatus 19 that supplies fluidizing gas 18 fluidizing the fluidizing material 11 inside the fluidizing layer reaction unit 12, the heating apparatus 20 that heats the fluidizing layer reaction unit 12, a pressurizing unit 102 that pressurizes interior of the fluidizing layer reaction unit 12, the recovery line 23 that recovers carbon nanofibers 52 and the fluidizing material 11 scattered from the free board unit 17, and the separating apparatus 24 that separates the fluidizing material 11 and the carbon nanofibers 52 recovered in the recovery line 23. In FIG. 27, numeral 103 denotes a pressure-adjusting valve and 104 denotes a carburetor, respectively.

The pressurizing unit 102 includes, for example, liquefied nitrogen, and the fluidizing material supplying apparatus 105 which supplies the fluidizing material 11, the raw material supplying apparatus 14, the fluidizing material gas supplying apparatus 19 and the catalyst supplying apparatus 101 are pressurized by the carburetor 104. The pressurizing condition is preferably 0.5 MPa or more, and more preferably 2 MPa.

The upper limit of the pressurizing condition should be set to 3 MPa. This is because, by setting the pressurizing condition to 0.5 MPa or more, a fast reaction speed can be obtained so that the reaction efficiency can be improved. By adjusting the pressurizing condition, the precipitation condition of carbon nanofibers can be controlled. When the pressurizing condition exceeds 3 MPa, a pressure proof reference for apparatuses and peripheral devices becomes high and manufacturing costs increase, which is not desirable.

By setting the interior of the fluidizing layer reaction unit 12 to the pressurizing condition, the reaction efficiency can be improved.

Figure 29:
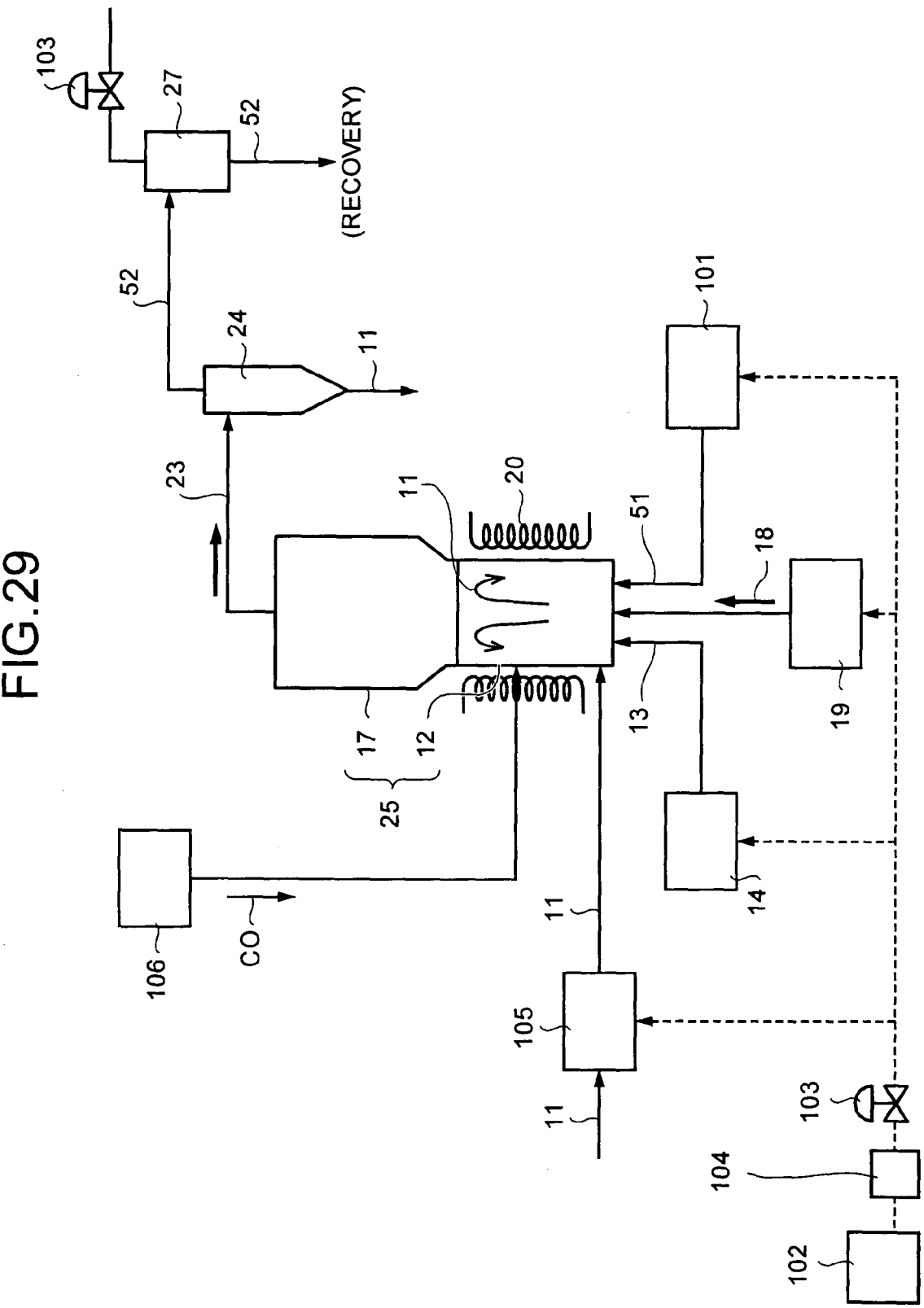
FIG. 29 is a schematic diagram of still another production apparatus of carbon nanofibers.

One example of another apparatus for producing carbon nanofibers is shown in FIG. 29. As shown in FIG. 29, the production apparatus of carbon nanofibers has such an arrangement that a CO supplying apparatus 106 that supplies CO into the fluidizing layer reaction unit 12 is provided in the apparatus shown in FIG. 28.

Figure 30:
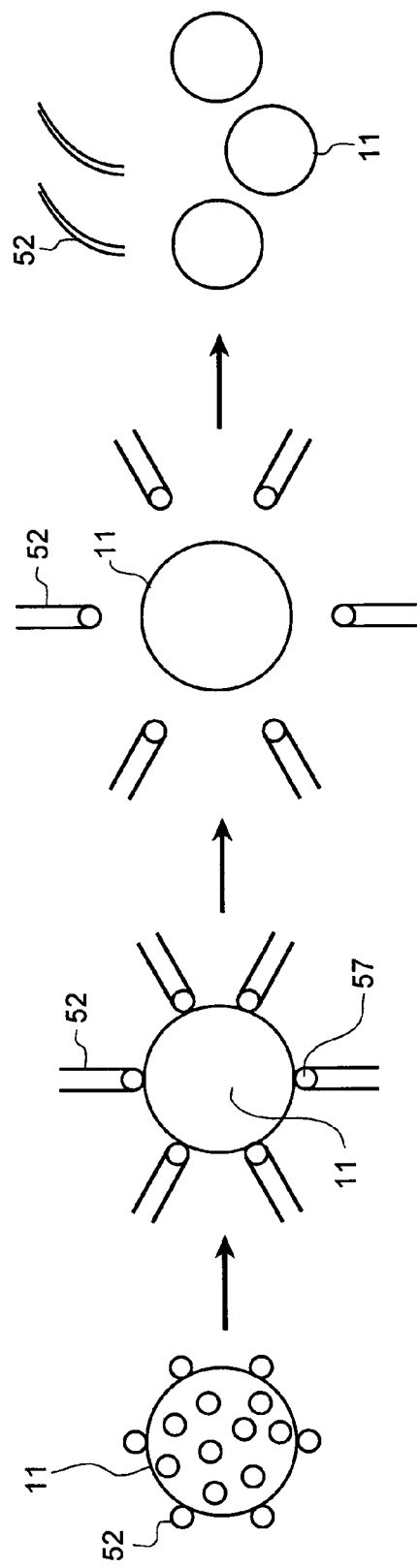
FIG. 30 is a diagram of an outline of a refining process of carbon nanofibers.
Figure 31:
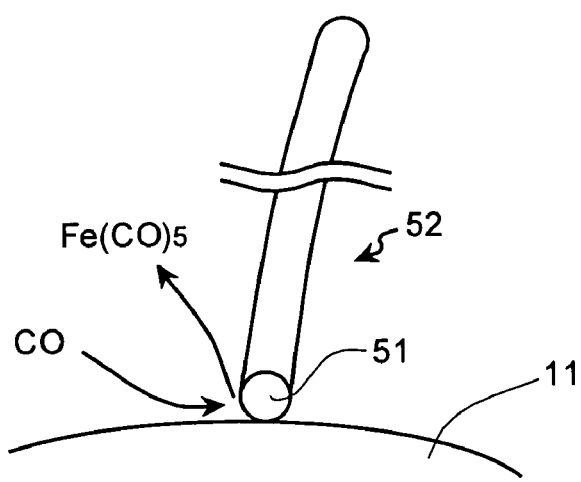
FIG. 31 is an illustrative diagram of refining of carbon nanofibers.

When the obtained carbon nanofibers 52 are present alone, refining is not required, but since carbon nanofibers adhere to fluidizing material or the reaction unit 12, after reaction is terminated, the catalyst 51 disappears as $Fe(CO)_5$ to refine the carbon nanofibers 52 by continuing the pressurizing by the pressurizing unit 21 without a break to supply CO from the CO supplying apparatus 31, as shown in FIG. 30 and FIG. 31.

After the carbon nanofibers 52 are put in a separated state in this manner, they are separated by the separating apparatus 24, the carbon nanofibers 52 and the fluidizing material 11 are separated and the carbon nanofibers 22 are recovered as they are.

The refining condition is satisfied by conducting temperature control such that at least the vapor pressure attains a temperature obtained at 0.01 MPa (atmospheric pressure of 0.1) or more. As the temperature condition, for example, temperature control may be made to the boiling point (102.5° C.) of the $Fe(CO)_5$, and it is desirable that the temperature is kept at the boiling point or more. It is preferable that the pressurizing condition at that time is in a range of 0.01 to 2.5 MPa (0.1 to 25 atmospheric pressure).

As a result, since the catalyst metal component disappears, the fluidizing material can be recycled and since the obtained carbon nanofibers do not adhere to the metal catalyst, carbon nanofibers with high purity can be obtained.

When the carbonyl is added, the pressurizing unit 102 is omitted, and producing carbon nanofibers in the fluidizing layer reaction unit 12 can be made under normal conditions.

Such an arrangement may be employed that, by making the pressurizing condition in isolation refining of carbon nanofibers conducted by the fluidizing layer reaction apparatus larger than that in production of carbon nanofibers, the disappearing efficiency is improved.

Figure 32:
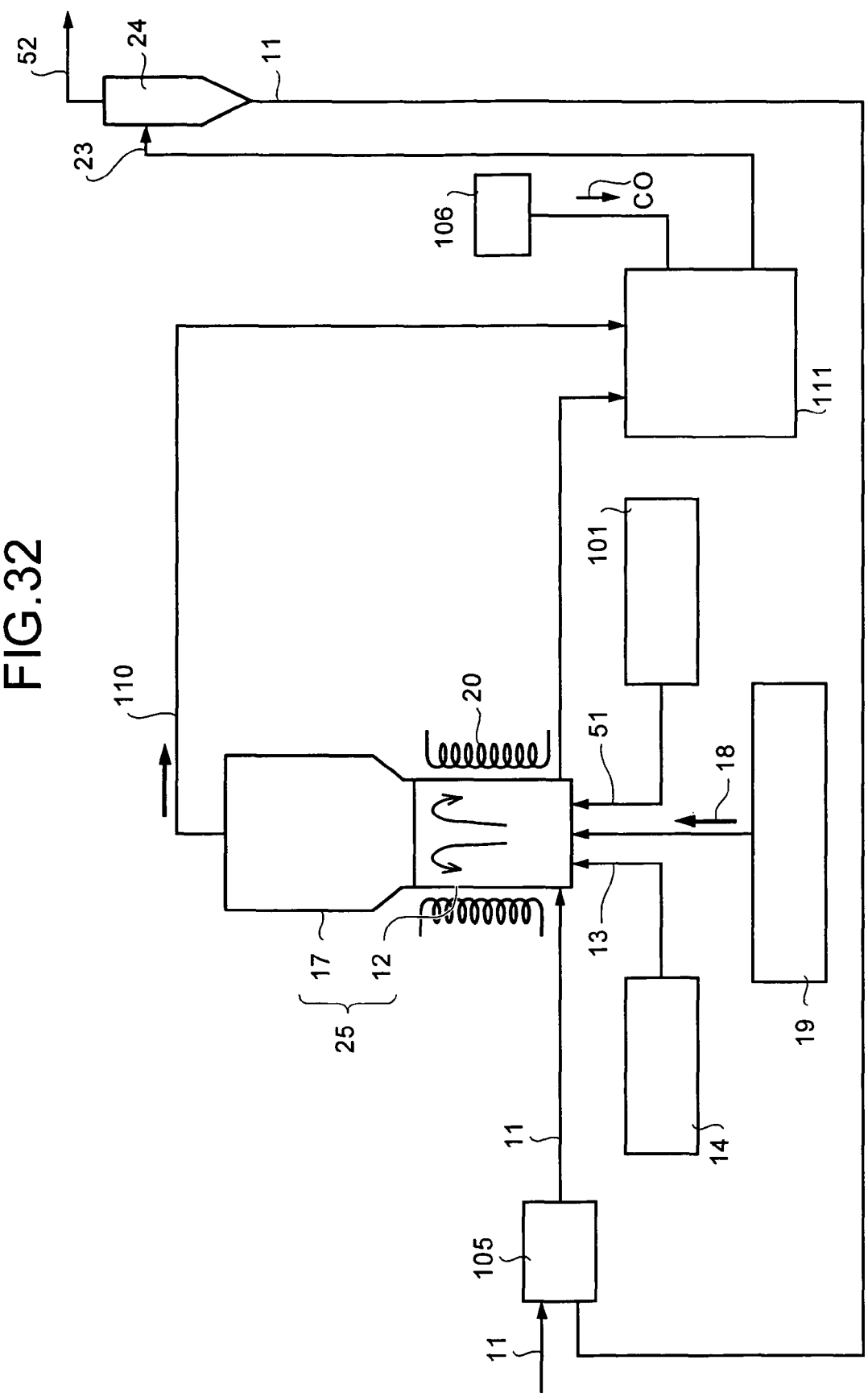
FIG. 32 is a schematic diagram of still another production apparatus of carbon nanofibers.

FIG. 32 is a diagram of one example of another apparatus of carbon nanofibers. The same elements as those shown in FIG. 29 are shown with the same numerals, and therefore explanations thereof will be omitted. As shown in FIG. 30, the production apparatus of carbon nanofibers is provided with the fluidizing layer reaction unit 12 in which fluidizing material 11 has been charged, the raw material supplying apparatus 14 that supplies carbon material 13 into the fluidizing layer reaction unit 12, a catalyst supplying apparatus 101 that supplies catalyst 51 into the fluidizing layer reaction unit 12, the free board unit 17 having a space in which the fluidizing material 11 inside the fluidizing layer reaction unit 12 scatters or flows down, the fluidizing gas supplying apparatus 19 that introduces fluidizing gas 18 fluidizing the fluidizing material 11 inside the fluidizing layer reaction unit 12 to supply the same therein, the heating apparatus 20 that heats the fluidizing layer reaction unit 12, a pressurizing vessel 111 that pressurizes carbon nanofibers 22 produced in the fluidizing layer reaction unit 12 after the carbon nanofibers 22 are conveyed by a conveying line 110 together with the fluidizing material 11, a CO supplying apparatus 106 that supplies CO (carbonyl) into the pressurizing vessel 111, the recovery line 23 that that recovers separated carbon nanofibers 52 and fluidizing material 11 from the pressurizing vessel 111, and the separating apparatus 24 that separates the fluidizing material 11 and the carbon nanofibers 52 recovered in the recovery line 23 from each other.

In the production apparatus of carbon nanofibers, after carbon nanofibers are moved into the pressurized vessel 111, producing carbon nanofibers and refining carbon nanofibers are performed separately by supplying CO (carbonyl) from the CO supplying apparatus 106.

Next, in the production apparatus of carbon nanofibers of the present invention, improvement of the free board unit constituting the reaction unit will be explained.

Figure 33:
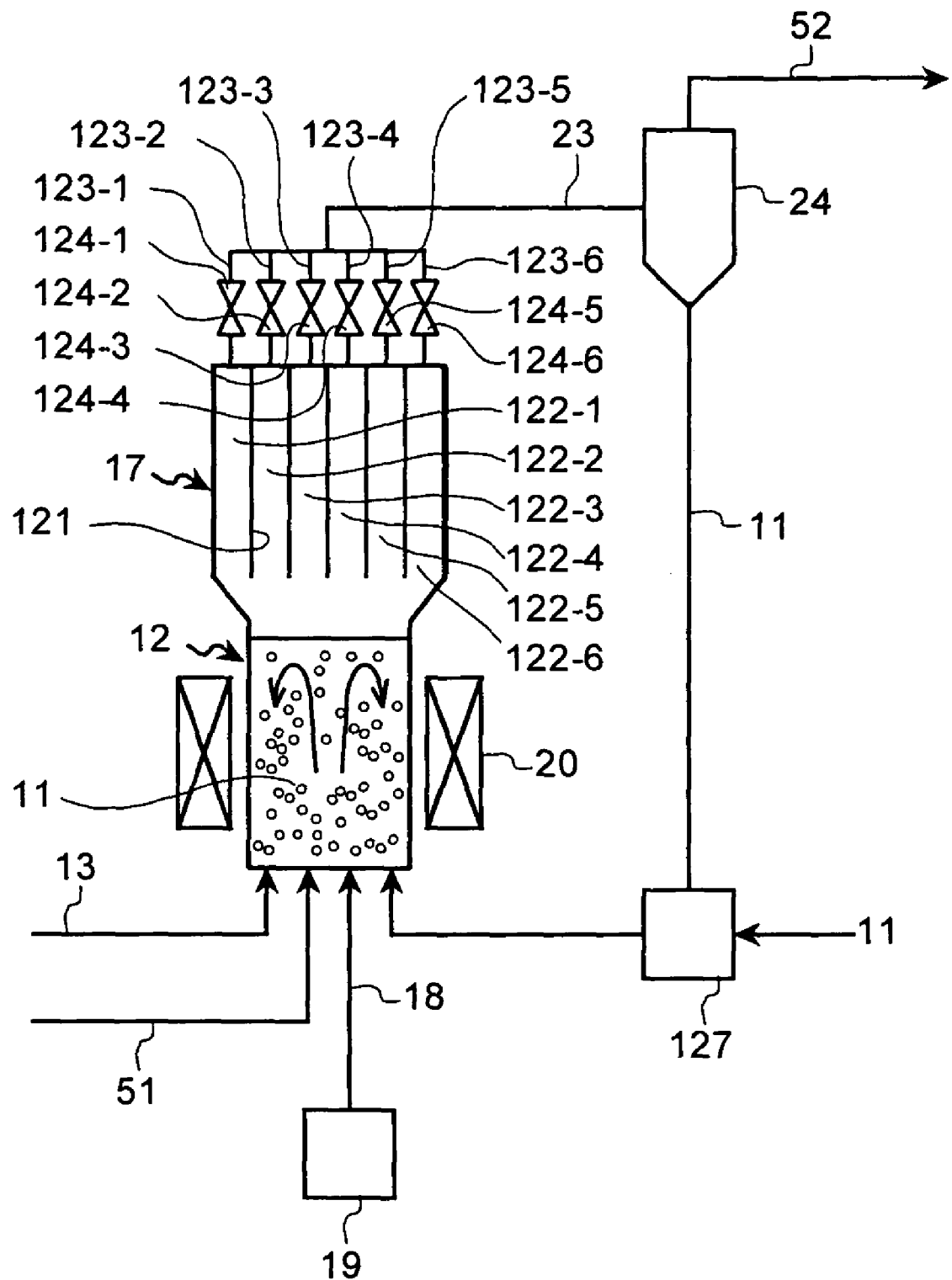
FIG. 33 is a schematic diagram of still another production apparatus of carbon nanofibers.

FIG. 33 is a diagram of an outline of another production apparatus of carbon nanofibers. The same members as those shown in FIG. 16 are shown with the same numerals, and therefore explanations thereof will be omitted. As shown in FIG. 33, the production apparatus of carbon nanofibers according to this embodiment is provided with a fluidizing layer reaction unit 12 that supplies carbon material 13, catalyst 51 and fluidizing material 11 to produce carbon nanofibers 52, a free board unit 17 that has a space communicating with the fluidizing layer reaction unit 12, through which fluidizing material 11 scatters and flows down, the fluidizing gas supplying apparatus 19 that introduces fluidizing gas 18 fluidizing fluidizing material 11 into the fluidizing layer reaction unit 12 to supply the same, the heating apparatus 20 that heats the fluidizing layer reaction unit 12 from the periphery thereof, the recovery line 23 that recovers fluidizing material 11 and carbon nanofibers 52 scattered from the free board unit 17, and the separating apparatus 24 that separates the fluidizing material 11 and the carbon nanofibers 52 recovered by the recovery line 23. Further, partition members 121 dividing interior of the free board unit 17 into plural portions (six chambers in this embodiment) are hung from a free board top portion to divide the interior into chambers 122-1 to 122-6 that are opened at their lower ends, a plurality of recovery lines 123-1 to 123-6 that cause the recovery line 23 and respective chambers separated to communicate with each other is provided and opening/closing valves 124-1 to 124-6 that open/close flow paths of the respective recovery lines are provided.

By supplying carbon material 13, catalyst 51 and fluidizing material 11 to the fluidizing layer reaction unit 12, respectively, and supplying fluidizing material gas 18 to fluidize the fluidizing material 11, and by setting predetermined pressure and temperature, a uniform reaction is performed by the fluidizing layer, which results in production of carbon nanofibers 52.

Figure 40:
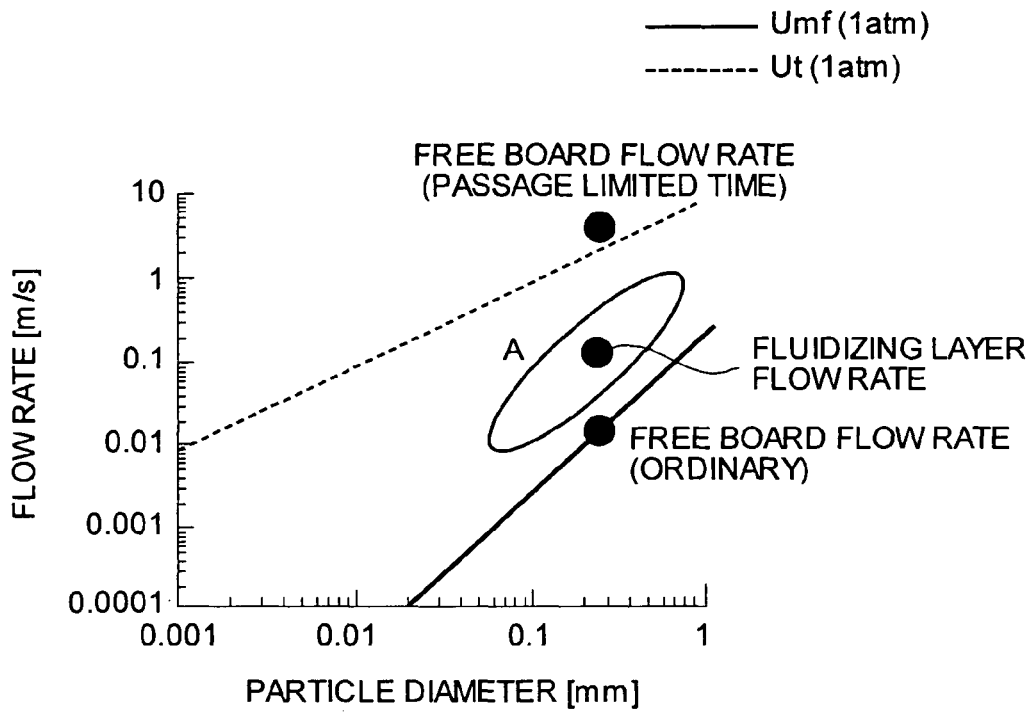
FIG. 40 is a graph showing a relationship between particle diameter of fluidizing material and flow rate.

When the fluidizing material 11 with a particle diameter of, for example, about 200 µm is used, as shown in FIG. 40, a flow rate in the fluidizing layer is about 0.1 m/s, and a flow rate in the free board portion 17 is about 0.01 m/s. In this case, all valves 124-1 to 124-6 interposed in the recovery line 123-1 to 123-6 in communication with the respective chambers 122-1 to 122-6 formed in the free board portion 17 are put in an open state. Production of carbon nanofibers is performed in such a state.

In a stage where produced carbon nanofibers adhere to a wall face of the chambers or the like and adhered material has been accumulated in a predetermined amount, for example, the first recovery line 123-1 is limited and the other valves in the recovery lines 123-2 to 123-6 are put in a closed state, a flow rate of the fluidizing material 11 in the fluidizing layer reaction unit 12 is increased so that the fluidizing material splashed from the fluidizing layer to fly out is positively transported to an upper portion of the free board unit 17. Since some of particles transported drop along a wall face inside the flow path, the adhered material is worn, peeled off and scattered to be caused to pass through the recovery line 23 so that carbon nanofibers 52 are recovered in the separating apparatus 24.

Figure 34:
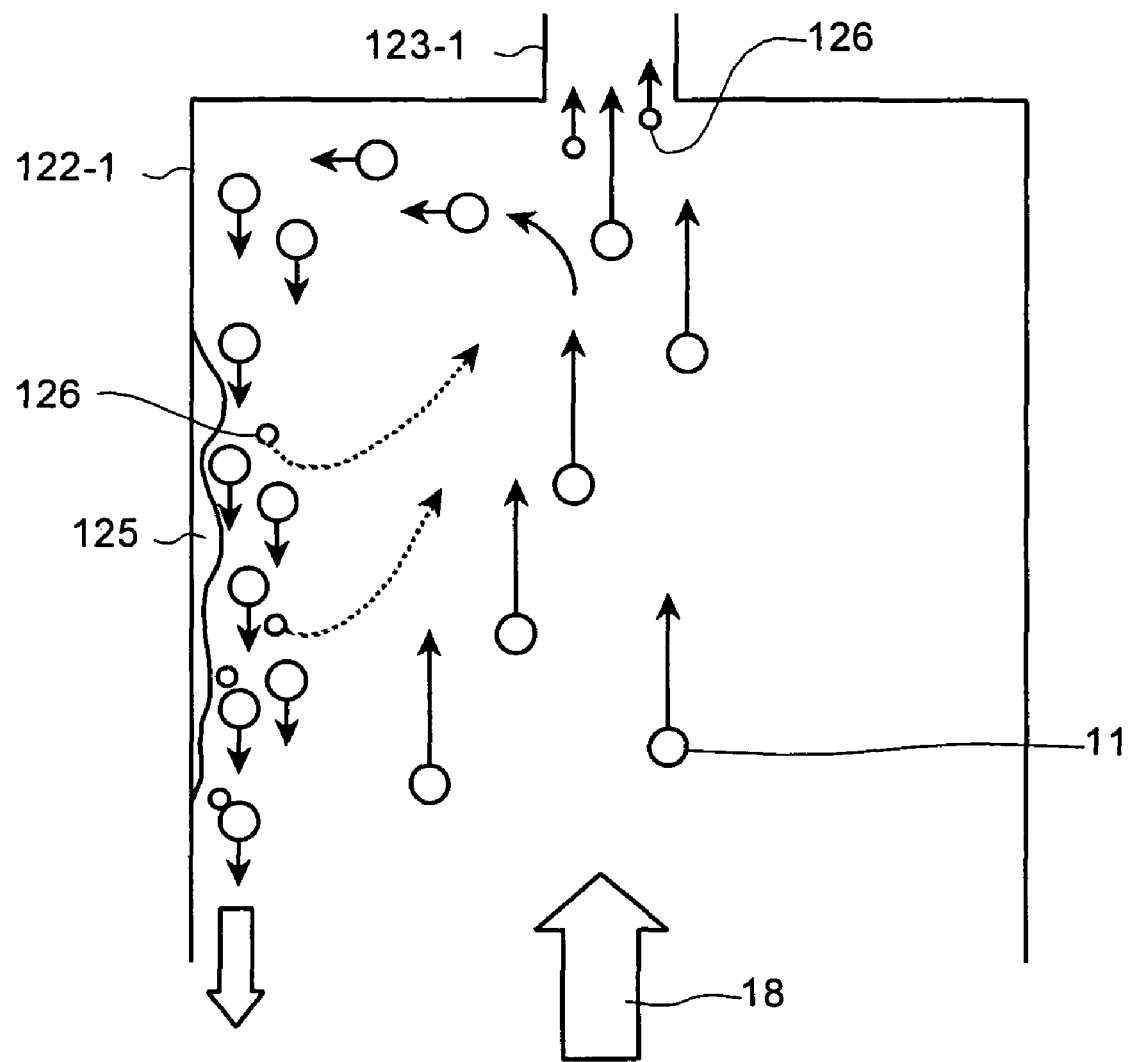
FIG. 34 is a schematic diagram of one portion of a free board portion according to an embodiment of the present invention.

A state where the adhered material is peeled off by the fluidizing material is explained with an illustrative diagram shown in FIG. 34. FIG. 34 is a schematic diagram of the chamber 122-1. As shown in FIG. 34, carbon nanofibers with a nano unit are adhered to an inner wall face of the chamber 122-1 to form adhered material 125. The adhered material 125 is peeled off by physical influence occurring when the fluidizing material 11 flows down, and a portion thereof drop downwardly together with the fluidizing material 11 and a portion of peeled-off material 126 is conveyed to the recovery line 23 through the recovery line 123-1 by the fluidizing gas and is separated in the separating apparatus 24.

The recovered fluidizing material 11 can be recycled. Such an arrangement is employed that the recovered fluidizing material is mixed with fresh fluidizing material 11 to be supplied into the fluidizing layer reaction unit 12 by the fluidizing material supplying apparatus 127.

Thus, in this embodiment, even when the adhered material of carbon nanofibers 52 is produced, since the interior of the free board unit 17 are partitioned to a plurality of chambers, the flow rates in the chambers are sequentially adjusted, so that adhered material at any place can be peeled off at any time.

In this embodiment, means for partitioning the interior of the free board unit 17 to form the chambers is not limited to means for forming sectional shape in a direction crossing a vertical direction to a rectangular shape, as shown in FIG. 35(a), but it may be means for making 8 chambers divided along the circumferential direction, for example, as shown in FIG. 35(b) or may be means for making 9 divided chambers formed in a regular square, as shown in FIG. 35(c). The number of divisions is not limited at all. The fluidizing material and the carbon nanofibers recovered by the recovery line 123-1 to 123-6 are separated from each other in the separating apparatus, and the fluidizing material is recycled.

As explained above, according to this embodiment, in production of carbon nanofibers according to the fluidizing layer reaction mechanism, even if there is product adhered to a wall face or a pipe interior, adhered material at any place can be peeled off and recovered at any timing owing to a peeling-off phenomenon due to physical collision of fluidized materials by controlling a flow rate in the free board unit, so that a recovery efficiency of carbon nanofibers is improved. The staying time in the apparatus is controlled so that production of carbon nanofibers with uniform quality is made possible.

Since uniform reaction inside the fluidizing layer reaction unit can be performed, catalyst and carbon material can react with each other under an excellent condition. At this time, since free board adhered material can be recovered at any time and at any place, uniformity of product can be prevented from being lowered due to the phenomenon that catalyst, carbon nanofibers and the like adhered to the free board unit fall off irregularly.

Figure 36:
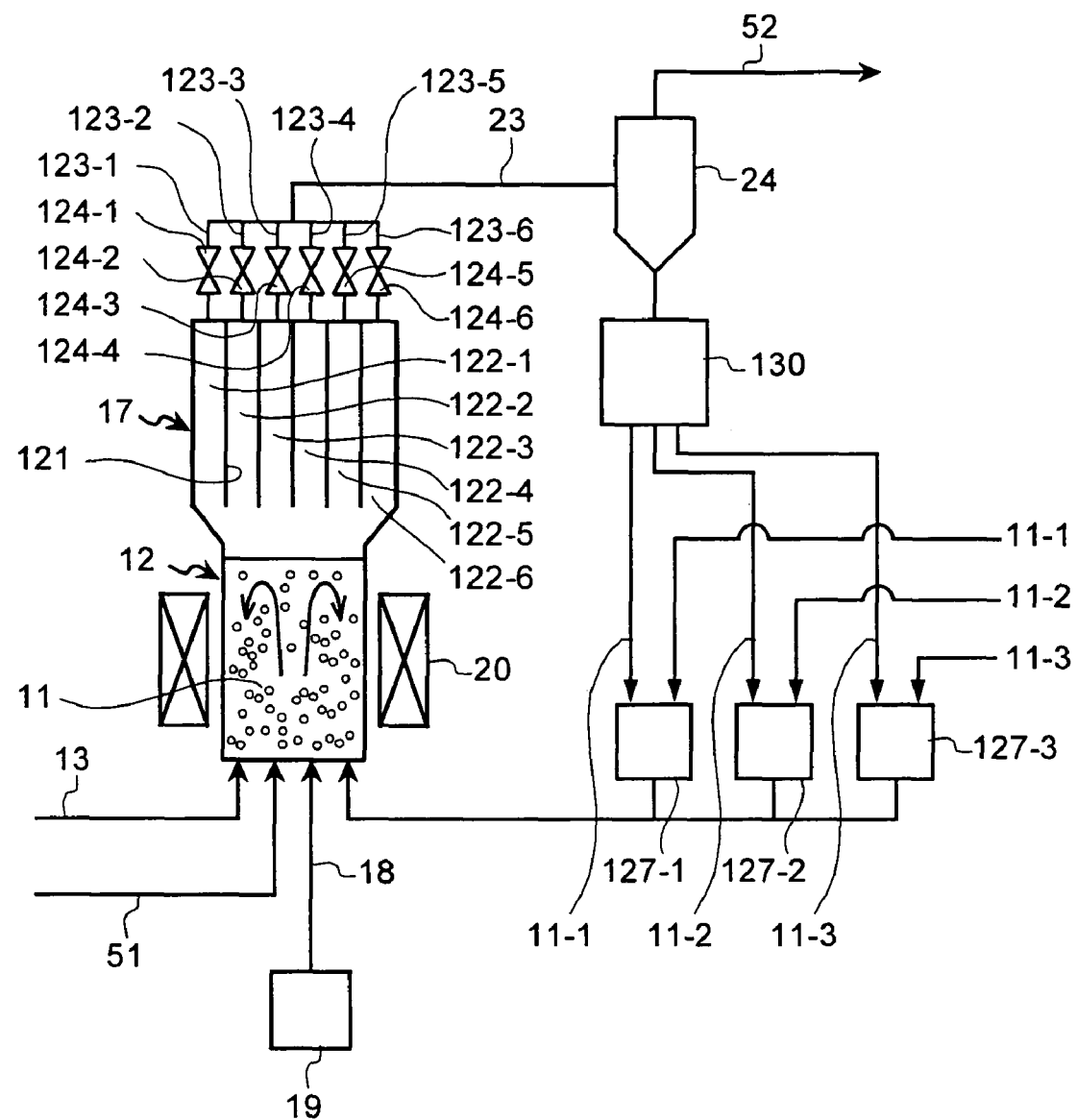
FIG. 36 is a schematic diagram of still another production apparatus of carbon nanofibers.

FIG. 36 is a diagram of a production apparatus of carbon nanofibers where the free board unit is improved according to another embodiment. The same members as those shown in FIG. 33 are shown with the same numerals, and therefore explanations thereof will be omitted.

In the embodiment, fluidizing materials with two or more particle diameter distributions are used in the production apparatus of carbon nanofibers shown in FIG. 33.

As shown in FIG. 36, in this embodiment, coarse particle fluidizing material (particle diameter of 200 μm) 11-1, middle particle fluidizing material (particle diameter of 20 μm) 11-2, and a fine particle fluidizing material (particle diameter of 2 μm) 11-3 of three different kinds are used.

The fluidizing materials 11-1 to 11-3 recovered can be recycled. In order to perform recycling, the recovered fluidizing materials and fresh fluidizing materials 11-1 to 11 to 3 are mixed to be supplied from fluidizing material supplying apparatus 127-1 to 127-3 into the fluidizing layer reaction unit 12.

In an ordinary reaction, scattering of particles to the free board unit 17 is prevented by using the coarsest particle fluidizing material 11-1.

When adhered material to a wall face of the free board portion 17 should be peeled off, peeling-off of the adhered material is performed by using the fluidizing material with the middle particle diameter (20 μm) which can be scattered toward the free board portion 17.

The coarsest particles 11-1, the middle particles 11-2 and the fine fluidizing material 11-3 are different in relationship between the particle diameter and the flow rate of the fluidizing material. This relationship will be shown in FIG. 39.

When adhered material to a wall face of the downstream recovery line 23 should be removed, the adhered material is peeled off by using the fine particle fluidizing material 11-3.

Figure 37:
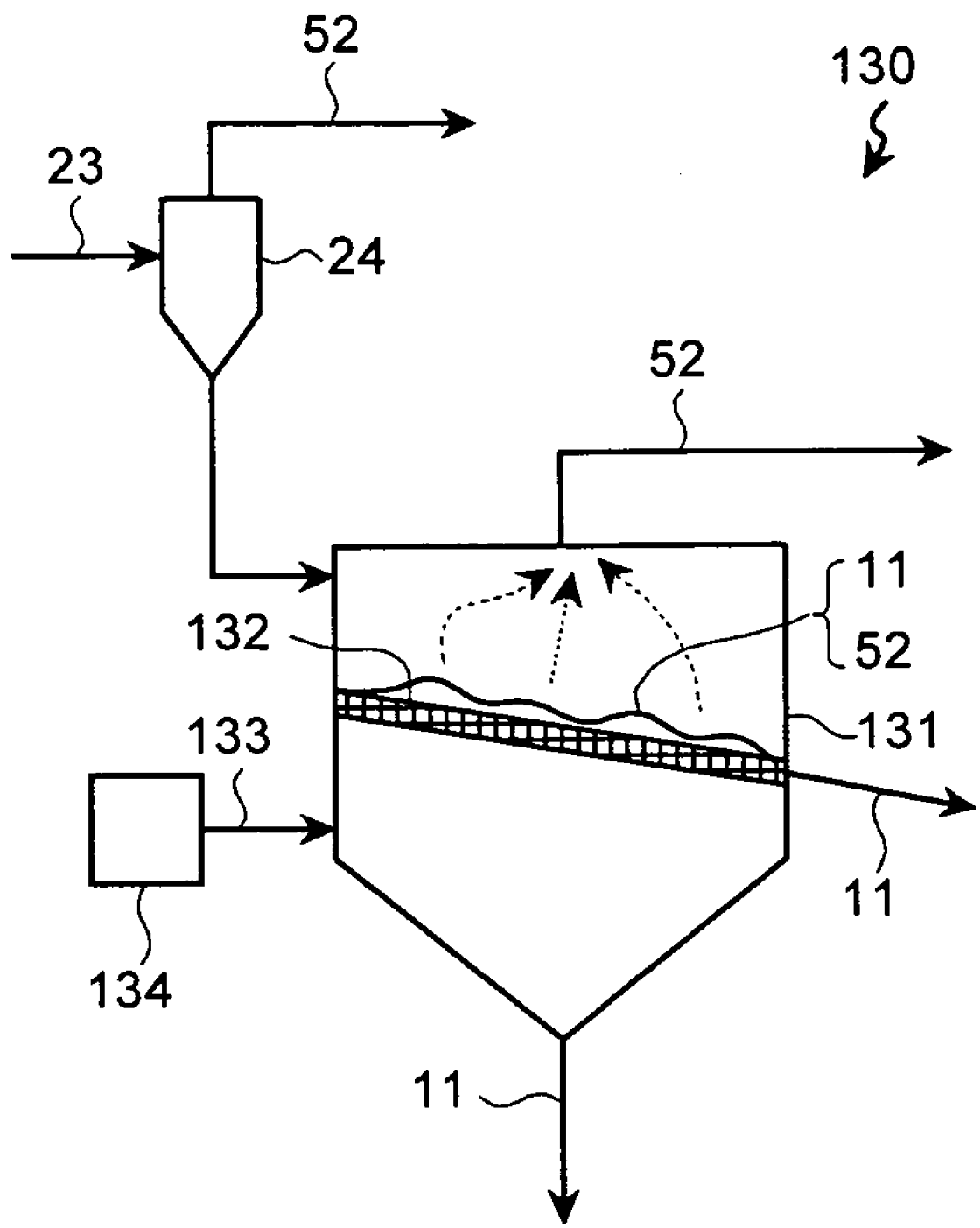
FIG. 37 is a schematic diagram of a fluidizing material separating apparatus.

Next, FIG. 37 is a diagram of one example of a fluidizing material separating apparatus for each particle diameter of fluidizing material separated in the cyclone 24. As shown in FIG. 37, a fluidizing material separating apparatus 130 is provided with a sieve 132 provided within a recovery cylinder 131 in a direction generally perpendicular to a vertical direction, and a gas supplying apparatus 134 that supplies inert gas 133 from a lower stage of the sieve 132, and the fluidized materials 11 separated by the cyclone are separated for each particle diameter and the carbon nanofibers 52 accompanied with the fluidizing materials 11 are separated from the fluidizing materials 11.

As shown in FIG. 37, the sieve 132 may be inclined such that a portion thereof on a recovery line supply port side (left side on the drawing) is lower than a portion thereof on an exhaust side (right side on the drawing), thereby improving the separating efficiency.

Figure 38:
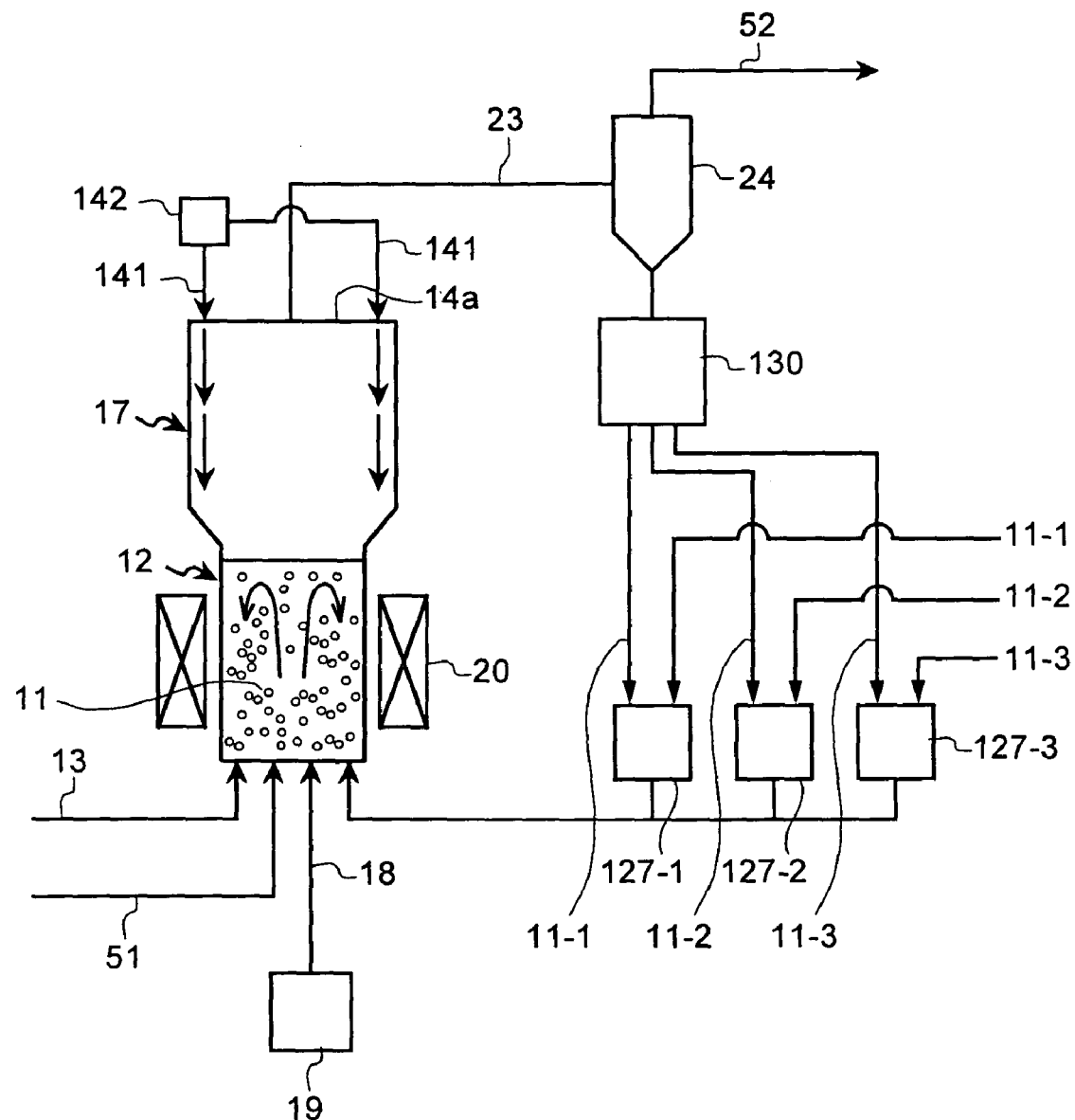
FIG. 38 is a schematic diagram of still another production apparatus of carbon nanofibers.

FIG. 38 is a diagram of an outline of another production apparatus of carbon nanofibers. The same members as those the apparatuses of the embodiments shown in FIG. 33 and FIG. 36 are shown with the same numerals, and therefore explanations thereof will be omitted. As shown in FIG. 38, the production apparatus of carbon nanofibers according to this embodiment are provided with the fluidizing layer reaction unit 12 that supplies carbon material 13 and catalyst 52 to produce carbon nanofibers 52, the free board unit 17 that has a space communicating with the fluidizing layer reaction unit 12, through which fluidizing material 11 scatters and falls down, a fluidizing gas supplying apparatus 19 that introduces and supplies fluidizing gas 18 fluidizing fluidizing material 11 into the fluidizing layer reaction unit 12, the heating apparatus 20 that heats the fluidizing layer reaction unit 12 from a periphery thereof, a recovery line 23 that recovers fluidizing material 11 and carbon nanofibers 52 scattered from the free board unit 17, and the separating apparatus 24 that separates the fluidizing material 11 and the carbon nanofibers 52 recovered in the recovery line 23 from each other, where a gas supplying apparatus 142 which drops and supplies inert seal gas 141 with a temperature lower than that in the apparatus from a periphery of a top portion 14 *a* of the free board unit 17 into the free board unit 17 is provided.

By providing the seal gas 141, gas flowing down along the wall face further increases the flow of the fluidizing material, so that adhered material such as carbon nanofibers adhered to the wall face can be peeled off. It is further suitable that the gas blow is constituted to perform blow gas along the wall face.

The seal gas is not limited to the low temperature gas, but it may be high temperature gas. Thereby, in case of the low temperature gas, falling-off of fluidizing material particles is promoted due to reduction of a flow rate owing to a cooling effect. On other hand, in the case of the high temperature gas, a source for adhesive force of the adhering layer is removed by decomposition, vaporization, burning or the like.

Such an arrangement can be employed that not only inert gas but also, for example, $O_2$, steam, $CO_2$ may be blown. These gases may be used alone or in a combination of two or more gases.

Figure 39:
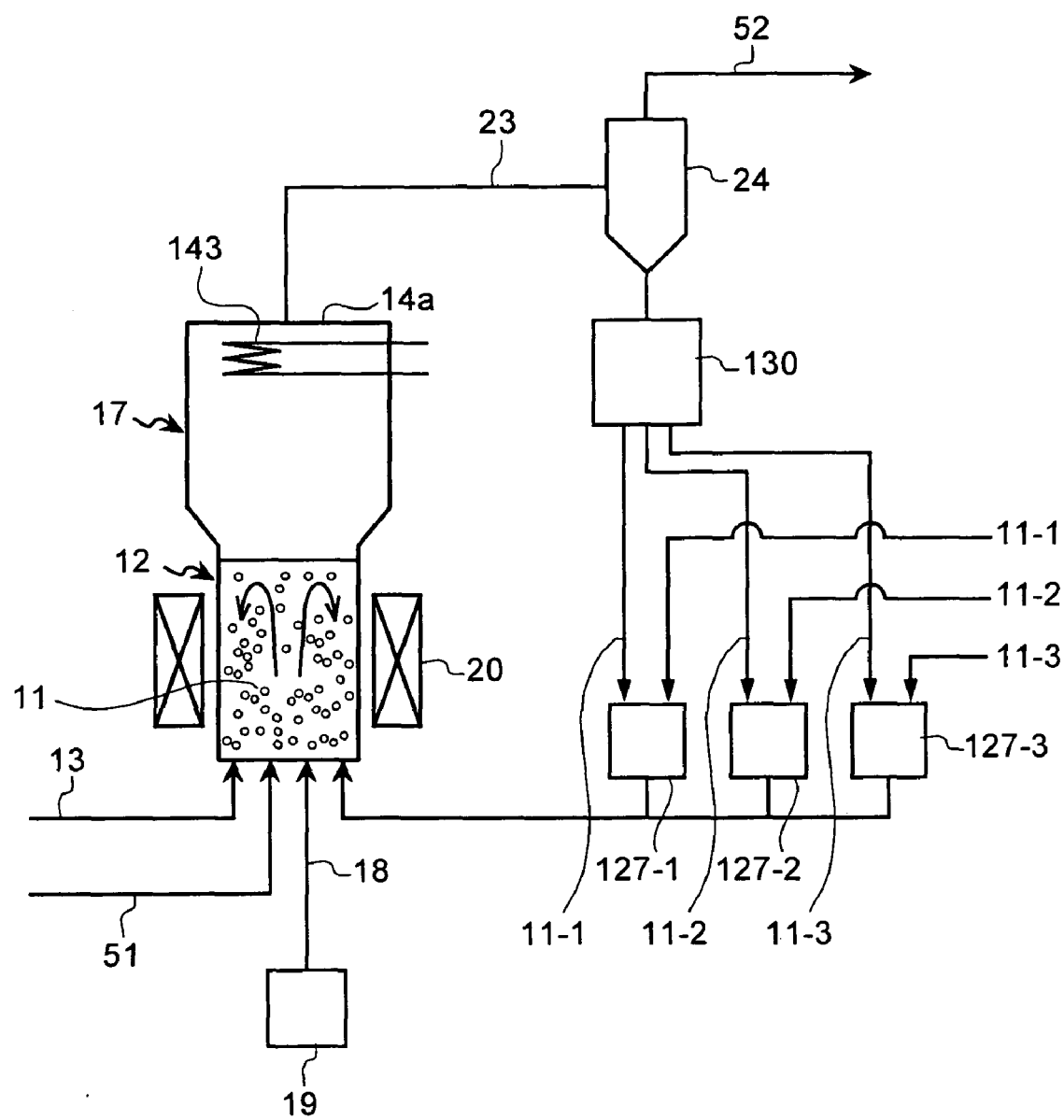
FIG. 39 is a schematic diagram of still another production apparatus of carbon nanofibers.

FIG. 39 is a diagram of an outline of another production apparatus of carbon nanofibers. The same members as those of the apparatuses of the embodiments shown in FIG. 33 and FIG. 36 are shown with the same numerals, and therefore explanations thereof will be omitted. As shown in FIG. 39, the production apparatus of carbon nanofibers according to the embodiment has an arrangement that a cooling unit 143 that cools a peripheral wall of the free board unit 17 near a top portion thereof or gas or both thereof is provided instead of supplying seal gas in the apparatus shown in FIG. 38.

Figure 42:
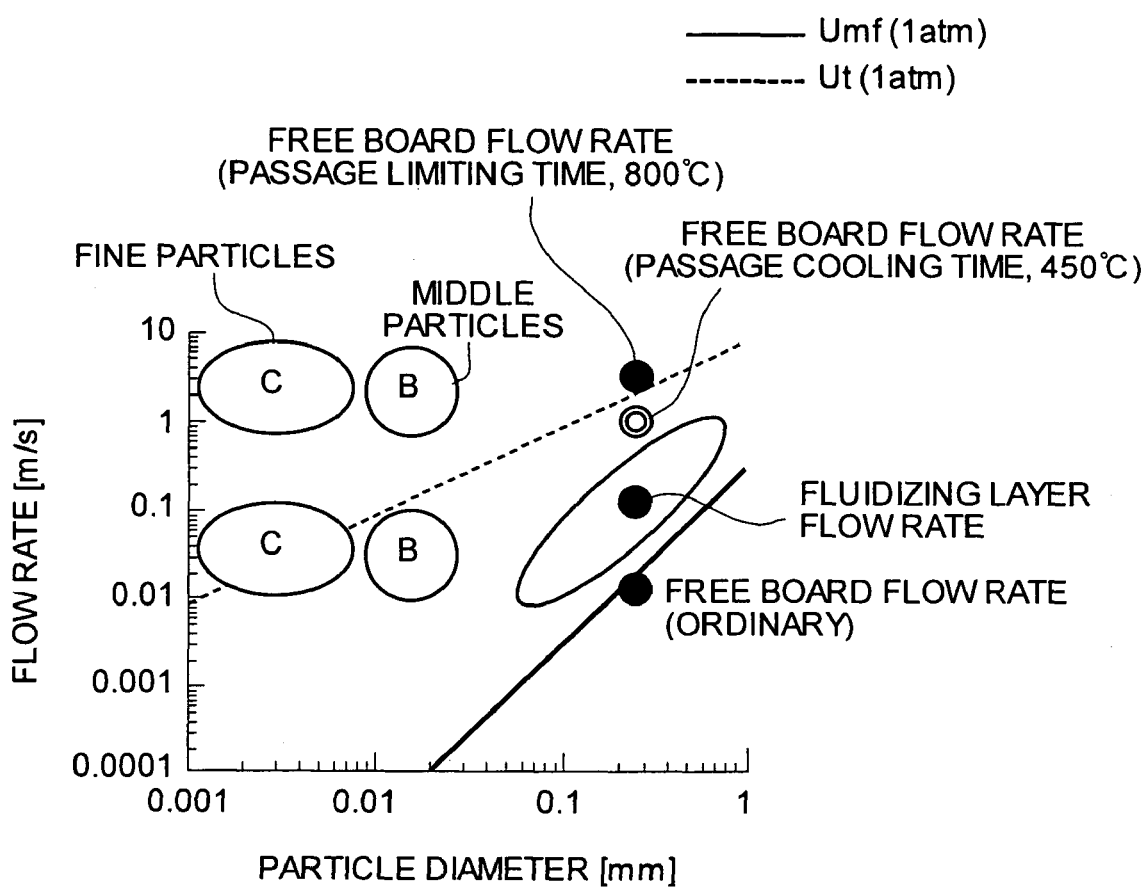
FIG. 42 is a graph showing a relationship between particle diameter of fluidizing material and flow rate.

By cooling an upper portion inside the free board unit 17, as shown in FIG. 42, since the flow rate decreases and does not exceed Ut, scattering toward the recovery line side does not occur and flowing-down along the wall face arises, so that adhered material of carbon nanofibers adhered to the wall face can be peeled off.

Instead of the cooling unit, a heating apparatus may be provided.

Figure 43:
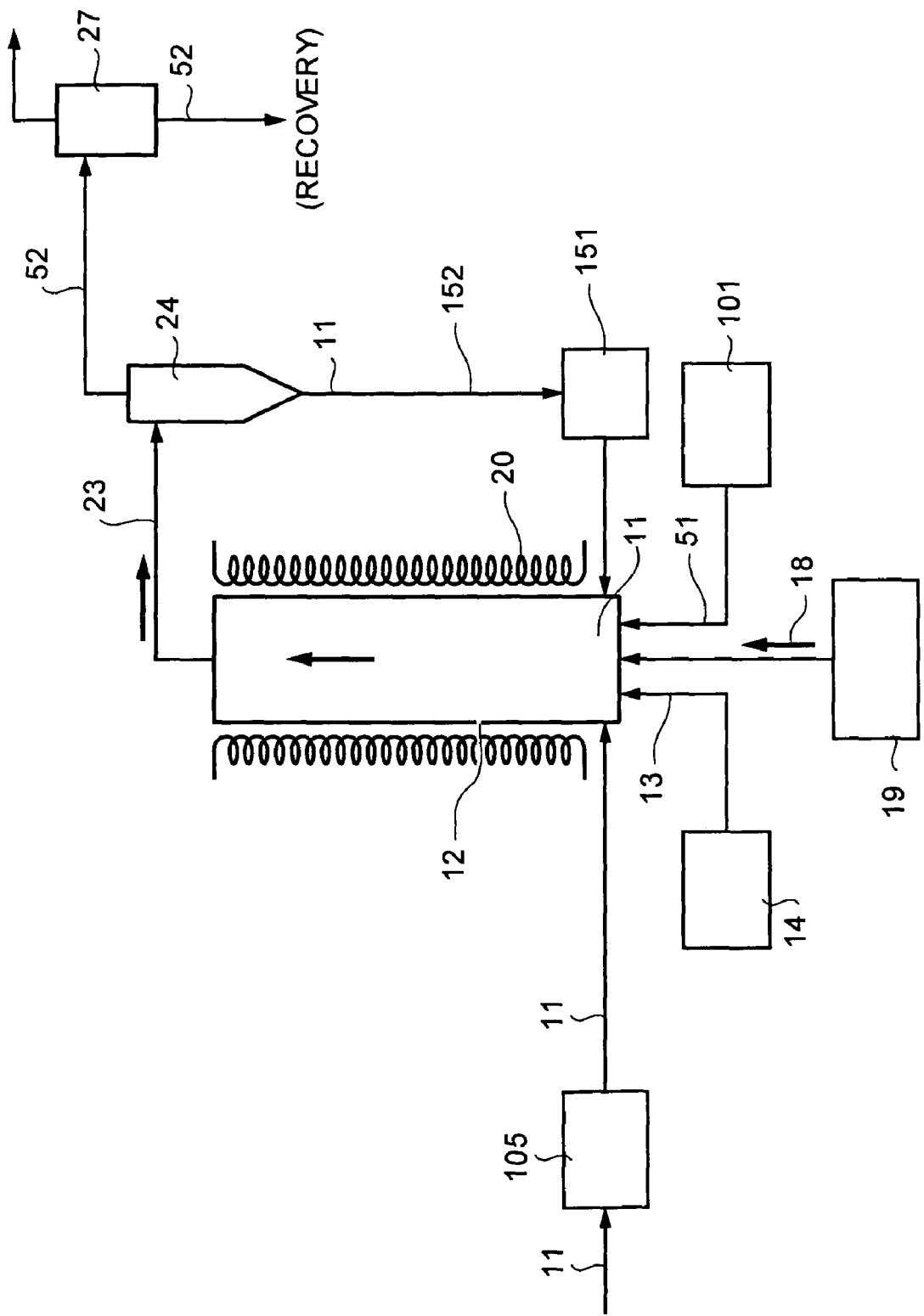
FIG. 43 is a schematic diagram of still another production apparatus of carbon nanofibers.

Next, FIG. 43 is a diagram of another example of an apparatus for producing carbon nanofibers. The same members as members in the producing apparatus of carbon nanofibers shown in FIG. 16 are shown with the same numerals and an explanation thereof will be omitted. As shown in FIG. 43, the production apparatus of carbon nanofibers is provided with a fluidizing layer reaction unit 12 in which fluidizing material 11 has been charged, the raw material supplying apparatus 14 that supplies carbon raw material 13 into the fluidizing layer reaction unit 12, a catalyst supplying apparatus 101 that supplies catalyst 51 into the fluidizing layer reaction unit 12, the fluidizing gas supplying apparatus 19 that supplies fluidizing gas 18 fluidizing fluidizing material 11 inside the fluidizing layer reaction unit 12, the heating apparatus 20 that heats the fluidizing layer reaction unit 12, the recovery line 23 that recovers carbon nanofibers 52 produced from the fluidizing layer reaction unit 12 and fluidizing material, the separating apparatus 24 that separates the fluidizing material 11 and the carbon nanofibers 52 recovered in the recovery line 23, and a recirculating line 152 provided with a circulating unit 151 that recirculates the separated fluidizing material 11 into the fluidizing layer reaction unit 12.

By recirculating the fluidizing material 11 into the fluidizing layer reaction unit 12 through the recirculating line 152, adhesion of non-reacted product or the like into the recovery line 23 is prevented and carbon nanofibers 52 adhered to the non-reacted product can be peeled off and recovered, so that the recovery efficiency of carbon nanofibers can be improved. As the circulating unit 151, a known unit such as an ejector can be used.

As a fluidizing bed reaction type for the fluidizing layer reaction unit 12, there are a bubble type fluidizing layer type and a jet flow type fluidizing layer type, and any one thereof can be used in the present invention.

Figure 41:
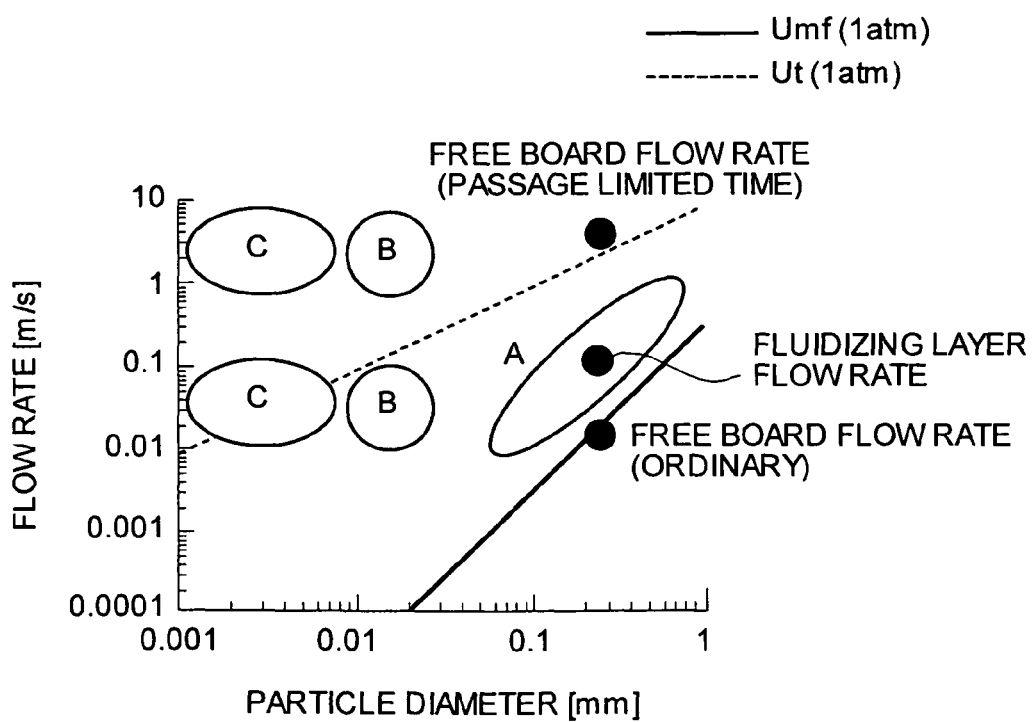
FIG. 41 is a graph showing a relationship between particle diameter of fluidizing material and flow rate.

Next, FIG. 44 is a schematic diagram of another apparatus for producing carbon nanofibers. As shown in FIG. 44, such an arrangement is employed that a plurality of drawing-out ports 161, which are drawing-out units for carbon nanofibers and fluidizing material 11 from the fluidizing layer reaction unit 12 are provided in a vertical direction of a furnace and different carbon nanofibers are recovered by separating apparatuses 24B, 24C in the production apparatus of carbon nanofibers shown in FIG. 41. Thereby, carbon nanofibers with different properties can be drawn out based upon a fluidizing time of the fluidizing layer reaction unit 12.

Figure 45:
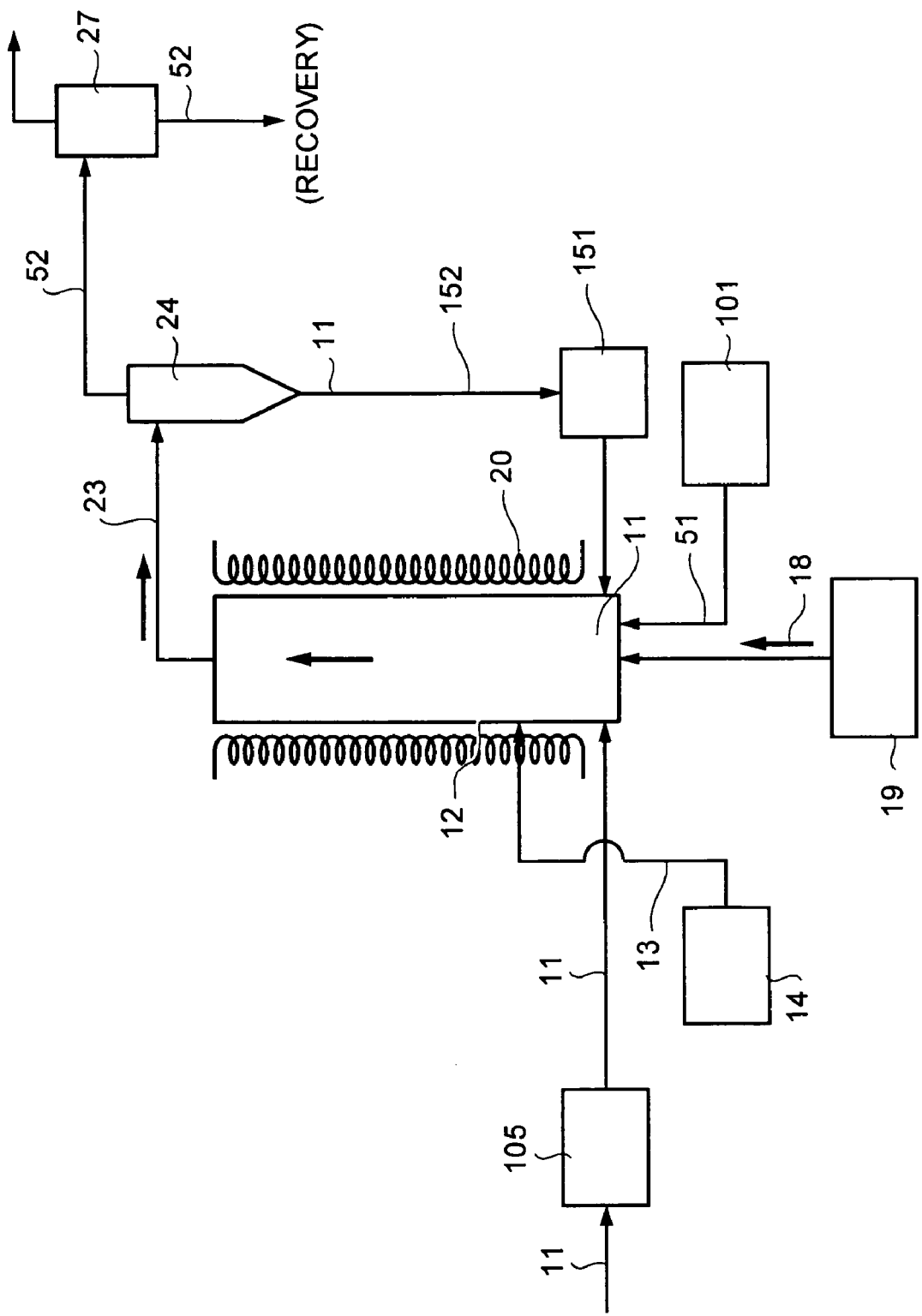
FIG. 45 is a schematic diagram of still another production apparatus of carbon nanofibers.
Figure 46:
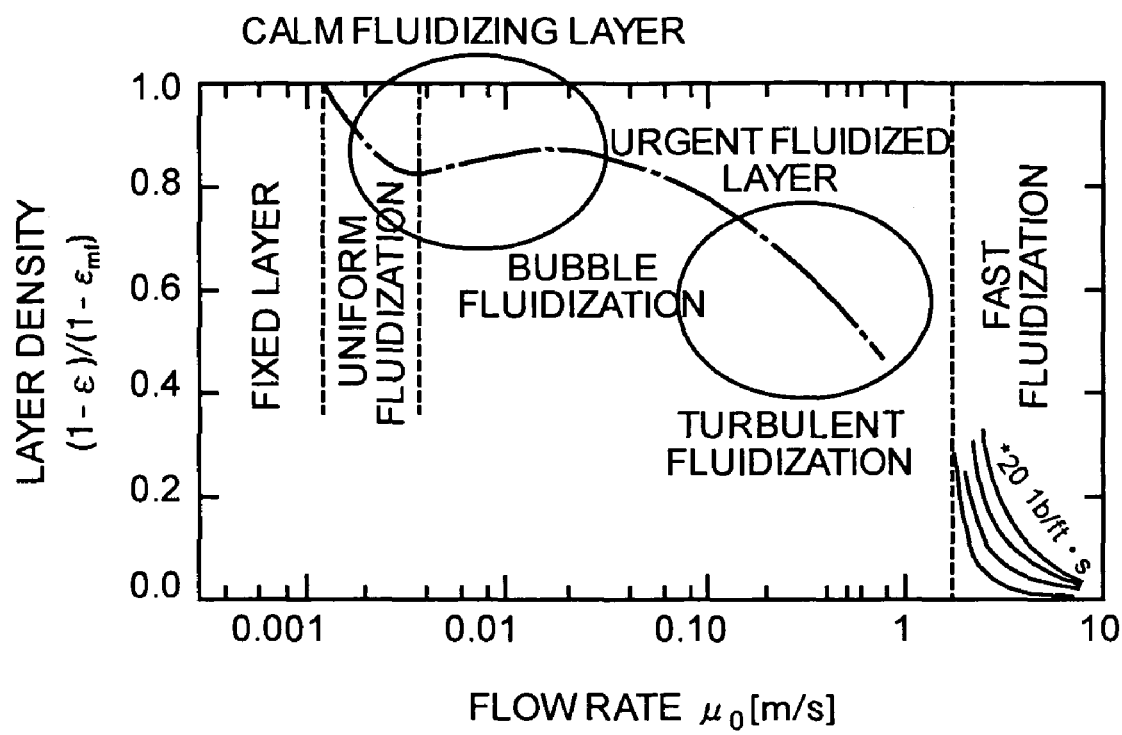
FIG. 46 is a diagram of a change of a bed density to fluidization of particles.

Next, FIG. 45 is a schematic diagram of another apparatus for producing carbon nanofibers. As shown in FIG. 45, by supplying catalyst metals 51 and fluidizing gas 18 supplied to the fluidizing layer reaction unit from a bottom portion side of a furnace and supplying carbon raw material 13 on a downstream side thereof (an outlet side of the reaction unit), more stable catalyst performance can be developed.

For example, when the catalyst metal is bimetal (Co/Mo) catalyst, in such a situation that respective Co component and Mo component are supplied to a furnace in their liquefied states and thereafter bimetal metal is formed, after the catalyst is produced sufficiently as bimetal, the catalyst is caused to contact with and react with the carbon material 13, so that the reaction efficiency is improved.

INDUSTRIAL APPLICABILITY

As described above, the production method of carbon nanofibers according to the present invention can produce carbon nanofibers with high purity, efficiently, with a high yield, by producing carbon nanofibers using fine particles, allows industrial mass production and it is suitable for producing inexpensive carbon nanofibers.

The invention claimed is:

1. A method for producing carbon nanofibers, comprising:
   causing carbon nanofibers to grow on surfaces of closely packed fine particles, a void ratio of each of the closely packed fine particles being 10% or less;
   recovering the closely packed fine particles; and
   separating the carbon nanofibers from the surfaces of the closely packed fine particles by a physical process to recover the carbon nanofibers.

2. The method according to claim 1, wherein the causing the carbon nanofibers to grow is performed by a process selected from the group consisting of a gas flow layer reaction process, a fixed layer reaction process, a moving layer reaction process and a fluidizing layer reaction process.

3. The method according to claim 1, wherein the causing the carbon nanofibers to grow is performed by a fluidizing layer reaction process in which the closely packed fine particles are utilized as a fluidizing material, and the carbon nanofibers are separated by collision among fine particles simultaneously with growth of the carbon nanofibers, to recover the carbon nanofibers.

4. The method according to claim 1, wherein the causing the carbon nanofibers to grow is performed by a fluidizing layer reaction process in which the closely packed fine particles are utilized as a fluidizing material in a slow fluidizing state, and wherein the closely packed fine particles are stirred after reaction termination to separate the carbon nanofibers by collision among the fine particles, to recover the carbon nanofibers.

5. The method according to claim 1, wherein the closely packed fine particles include at least one selected from the group consisting of silica sand, aluminosilicate, zeolite aluminum oxide, zirconium oxide, silicon carbide, silicon nitride, limestone, and dolomite.

6. The method according to claim 1, wherein the closely packed fine particles from which the carbon nanofibers have been separated are recycled for reaction.

7. The method according to claim 1, wherein a catalyst component is adhered to the closely packed fine particles.

8. The method according to claim 7, wherein additive particles for peeling off the carbon nanofibers, which are different from the catalyst component in particle shape, size and material quality, are used to separate the carbon nanofibers.

9. The method according to claim 7, wherein the catalyst component includes at least one selected from the group consisting of Na, K, Mg, Ca, Sr, Ba, Cr, Mn, Fe, Co, Ni, Mo, W, Ru, Rh, Pd, Ir, Pt, lanthanoid element, oxide thereof, chloride thereof, and nitrate thereof.

10. The method according to claim 9, wherein the catalyst component further contains sulfur.

11. The method according to claim 1, wherein the separating includes
    washing the closely packed fine particles with an acidic solution,
    adding an organic compound solution to the acidic solution containing the closely packed fine particles to disperse the carbon nanofibers in the organic compound solution, the organic compound solution being a mixture of an additive having a functional group with high affinity for carbon nanofibers or having a functional group with lipophilic property, and an organic compound which is liquid at room temperature, and
    evaporating the organic compound solution to obtain the carbon nanofibers.

12. The method according to claim 11, wherein the organic compound that is liquid at room temperature includes at least one selected from the group consisting of normal hexane, toluene, tetrahydrofuran, dimethylformamide, and chloromethane.

13. The method according to claim 11, wherein the additive is a compound having a polynuclear aromatic functional group.

14. The method according to claim 13, wherein the compound having a polynuclear aromatic functional group includes at least one selected from the group consisting of anthracene, pyrene and chrysene.

15. A method for producing carbon nanofibers, comprising:
    causing carbon nanofibers to grow on surfaces of closely packed fine particles, a void ratio of each of the closely packed fine particles being 10% or less, the closely packed fine particles including at least one selected from the group consisting of silica sand, aluminosilicate, zeolite aluminum oxide, zirconium oxide, silicon carbide, silicon nitride, limestone, and dolomite;
    recovering the closely packed fine particles; and
    separating the carbon nanofibers from the surfaces of the closely packed fine particles by a chemical process to recover the carbon nanofibers.

16. The method according to claim 15, wherein the causing the carbon nanofibers to grow is performed by a fluidizing layer reaction process in which the closely packed fine particles are utilized as a fluidizing material in a fluidizing state, and wherein the closely packed fine particles are stirred after reaction termination to separate the carbon nanofibers by collision among the fine particles to recover the carbon nanofibers.

17. The method according to claim 15, wherein the closely packed fine particles from which the carbon nanofibers have been separated are recycled for reaction.

18. The method according to claim 15, wherein a catalyst component is adhered to the closely packed fine particles.

19. The method according to claim 18, wherein additive particles for peeling off the carbon nanofibers, which are different from the catalyst component in particle shape size and material quality, are used to separate the carbon nanofibers.

20. The method according to claim 18, wherein the catalyst component includes at least one selected from the group consisting of Na, K, Mg, Ca, Sr, Ba, Cr, Mn, Fe, Co, Ni, Mo, W, Ru, Rh, Pd, Ir, Pt, lanthanoid element, oxide thereof, chloride thereof, and nitrate thereof.

21. The method according to claim 20, wherein the catalyst component further contains sulfur.

22. The method according to claim 15, wherein the separating includes washing the closely packed fine particles with an acidic solution, adding an organic compound solution to the acidic solution containing the closely packed fine particles to disperse the carbon nanofibers in the organic compound solution, the organic compound solution being a mixture of an additive having a functional group with high affinity for carbon nanofibers or having a functional group with lipophilic property, and an organic compound which is liquid at room temperature, and evaporating the organic compound solution to obtain the carbon nanofibers.

23. The method according to claim 22, wherein the organic compound that is liquid at room temperature includes at least one selected from the group consisting of normal hexane, toluene, tetrahydrofuran, dimethylformamide, and chloromethane.

24. The method according to claim 22, wherein the additive is a compound having a polynuclear aromatic functional group.

25. The method according to claim 24, wherein the compound having a polynuclear aromatic functional group includes at least one selected from the group consisting of anthracene, pyrene and chrysene.

* * * * *